(12) United States Patent
Suzuki et al.

(10) Patent No.: US 8,827,785 B2
(45) Date of Patent: Sep. 9, 2014

(54) GAME DEVICE, GAME DEVICE CONTROL METHOD, AND INFORMATION STORAGE MEDIUM THAT CONTROL A CHARACTER BASED ON VISIBILITY

(75) Inventors: Eiji Suzuki, Minato-ku (JP); Hajime Matsumaru, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1375 days.

(21) Appl. No.: 12/294,348

(22) PCT Filed: Mar. 6, 2007

(86) PCT No.: PCT/JP2007/054259
§ 371 (c)(1),
(2), (4) Date: Sep. 24, 2008

(87) PCT Pub. No.: WO2007/111090
PCT Pub. Date: Oct. 4, 2007

(65) Prior Publication Data
US 2009/0291724 A1 Nov. 26, 2009

(30) Foreign Application Priority Data
Mar. 27, 2006 (JP) .................. 2006-086729

(51) Int. Cl.
*A63F 13/00* (2014.01)
*A63F 13/30* (2014.01)
*A63F 13/40* (2014.01)

(52) U.S. Cl.
CPC .......... *A63F 13/10* (2013.01); *A63F 2300/638* (2013.01); *A63F 13/12* (2013.01); *A63F 2300/305* (2013.01); *A63F 2300/8011* (2013.01)
USPC ................ 463/4; 463/2; 463/3; 463/7; 463/8; 463/9

(58) Field of Classification Search
USPC .................................... 463/2–4, 7–9
See application file for complete search history.

(56) References Cited

U.S. PATENT DOCUMENTS 6,149,520 A 11/2000 Takatsuka
6,195,626 B1 2/2001 Stone
(Continued)

FOREIGN PATENT DOCUMENTS

JP 10-113471 A 5/1998
JP 10113471 A 5/1998
(Continued)

OTHER PUBLICATIONS

"Tenchu: Wrath of Heaven" (manual), 2003, Activision, pp. 1-15.*
(Continued)

*Primary Examiner* — Lawrence Galka
(74) *Attorney, Agent, or Firm* — Sughrue Mion, PLLC

(57) ABSTRACT

To provide a game device capable of preferably producing an image of a picture in which a first game character loses sight of a second game character having moved so as to disappear from view of the first game character, and thus delays in responding to the second game character. An operation target selection unit (72) selects an operation target character from among the plurality of first game characters. An operation target control unit (74a) changes a state of the first game character selected by the operation target selection unit (72), in the game space, based on a signal input from an operation unit. A selection restriction unit (72b) restricts, in the case where it is determined by the determination unit (72a) that the position of the second game character is included in a determination target area determined based on the position and orientation of the first game character, selection of that first game character by the operation target selection unit (72).

21 Claims, 13 Drawing Sheets

(56) References Cited

U.S. PATENT DOCUMENTS

| | | | |
|---|---|---|---|
| 6,676,518 | B1 | 1/2004 | Sawa et al. |
| 2003/0032483 | A1 | 2/2003 | Mifune et al. |
| 2003/0144045 | A1 | 7/2003 | Fujita |
| 2004/0176163 | A1 | 9/2004 | Ishihata et al. |
| 2004/0266526 | A1 | 12/2004 | Herbrich et al. |

FOREIGN PATENT DOCUMENTS

| | | |
|---|---|---|
| JP | 2001-204961 A | 7/2001 |
| JP | 2001204961 A | 7/2001 |
| JP | 2003-210848 A | 7/2003 |
| JP | 2005-131310 A | 5/2005 |
| JP | 2005131310 A | 5/2005 |
| TW | 527201 B | 4/2003 |
| TW | I235678 B | 7/2005 |

OTHER PUBLICATIONS

"Gameover review", [dated Apr. 5, 2004]. [online],[retrieved Oct. 27, 2011]. Retrieved from the Internet <URL:http://www.game-over.net/reviews.php?page=ps2reviews&id>. 4 pages.*

"Let's Play Tenchu Wrath of Heaven Part 2—Kill the corrupt merchant (R)". Video. [online], [retrieved Oct. 27, 2011] Retrieved from the Internet <URL:http://www.youtube.com/watch?v=cg4R3g4XxAA&feature=related>, 14 minutes, 23 seconds.*

"Tenchu 3—Co-op 1". Video. [online], [retrieved Oct. 30, 2011] Retrieved from the Internet <URL:http://www.youtube.com/watch?v=jmP1InVbAIA&feature=related>. 54 seconds.*

European Office Action corresponding to European Patent Application No. 07715227.0, dated Mar. 8, 2010.

Taiwanese Search Report dated Oct. 27, 2009, corresponding to Taiwanese Patent Application No. 96108383.

* cited by examiner

FIG.8
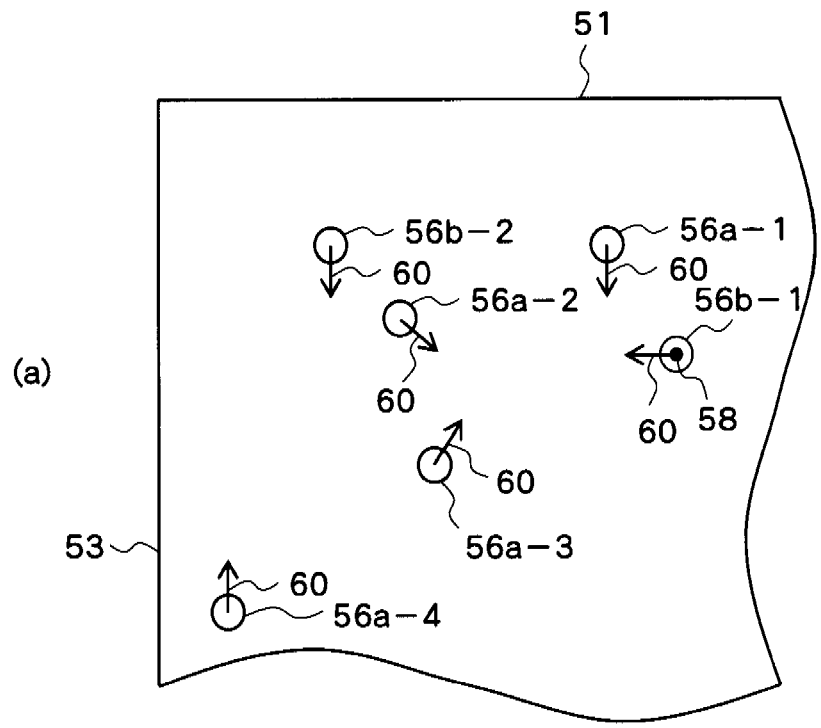
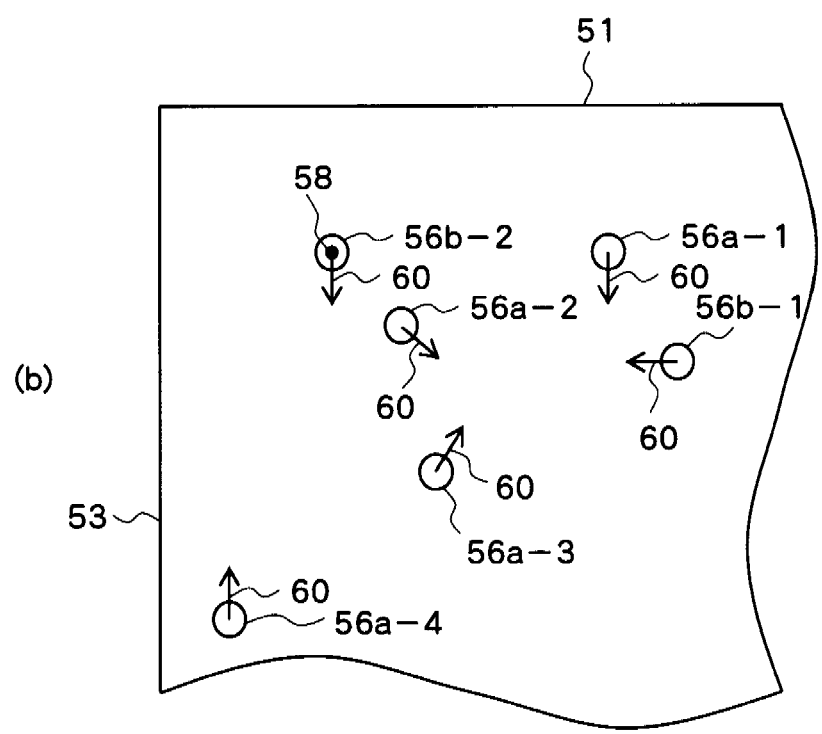

FIG.11

| PLAYER ID | POSITION KIND | POSITION | ORIENTATION | BALL HOLDING FLAG |
|---|---|---|---|---|
| A01 | GK | $(PX_{a01}, PY_{a01}, PZ_{a01})$ | $(DX_{a01}, DY_{a01}, DZ_{a01})$ | 0 |
| A02 | DF | $(PX_{a02}, PY_{a02}, PZ_{a02})$ | $(DX_{a02}, DY_{a02}, DZ_{a02})$ | 0 |
| ... | ... | ... | ... | ... |
| A11 | FW | $(PX_{a11}, PY_{a11}, PZ_{a11})$ | $(DX_{a11}, DY_{a11}, DZ_{a11})$ | 0 |
| B01 | GK | $(PX_{b01}, PY_{b01}, PZ_{b01})$ | $(DX_{b01}, DY_{b01}, DZ_{b01})$ | 0 |
| ... | ... | ... | ... | ... |
| B10 | FW | $(PX_{b10}, PY_{b10}, PZ_{b10})$ | $(DX_{b10}, DY_{b10}, DZ_{b10})$ | 1 |
| B11 | FW | $(PX_{b11}, PY_{b11}, PZ_{b11})$ | $(DX_{b11}, DY_{b11}, DZ_{b11})$ | 0 |

FIG.12

| OPERATION TARGET PLAYER ID | A02 |
|---|---|

FIG. 14

| PLAYER ID | SWITCHING ORDER |
|---|---|
| . . . | . . . |
| A03 | 1 |
| A04 | 3 |
| A05 | 2 |
| . . . | . . . |

| PLAYER ID | SWITCHING ORDER | REMAINING RESTRICTION PERIOD COUNTER |
|---|---|---|
| ... | ... | ... |
| A03 | 1 | 90 |
| A04 | 3 | 0 |
| A05 | 2 | 0 |
| ... | ... | ... |

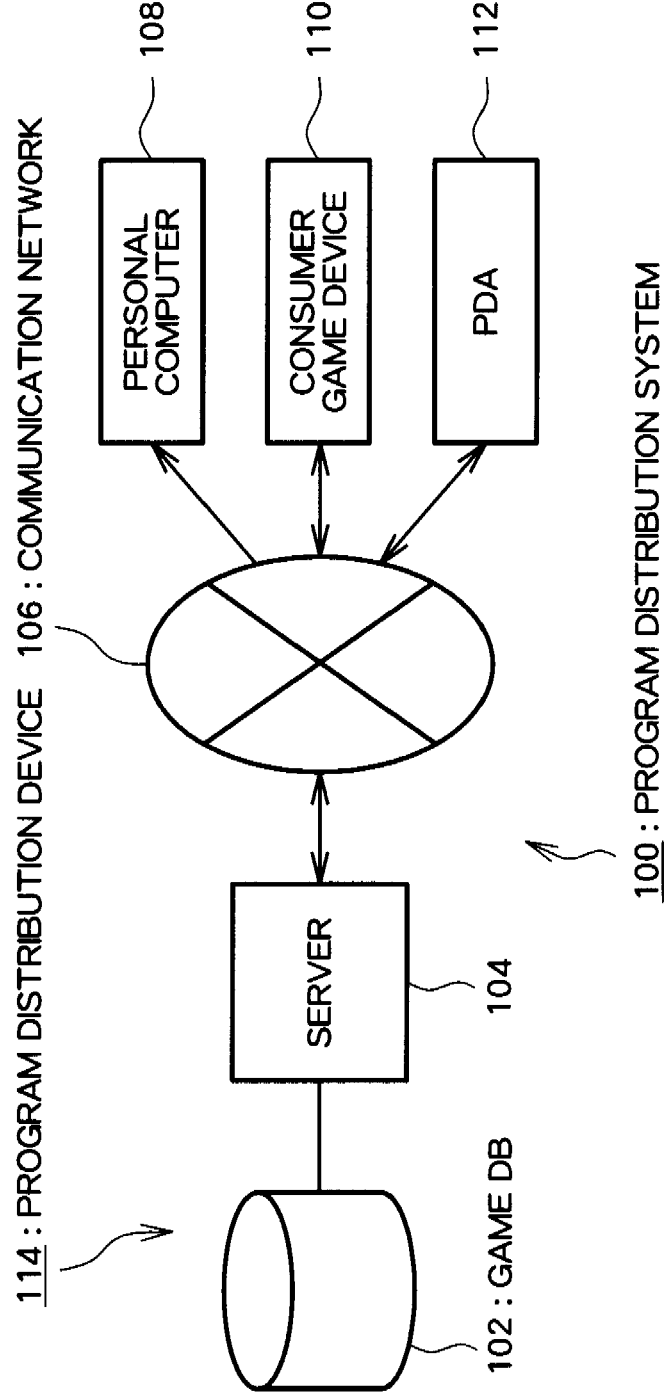

GAME DEVICE, GAME DEVICE CONTROL METHOD, AND INFORMATION STORAGE MEDIUM THAT CONTROL A CHARACTER BASED ON VISIBILITY

TECHNICAL FIELD

The present invention relates to a game device, a game device control method, and an information storage medium.

BACKGROUND ART

There is known a game device which shows a picture of a game space where a plurality of first game characters and a second game character are placed. For example, there is known a game device which shows a picture of a game space where eleven player characters belonging to a user's operation target team and eleven player characters belonging to an opponent team are placed, to thereby provide a soccer game to be played by the operation target team and the opponent team. Patent Document 1: Japanese Patent Laid-open Publication No. 2003-210848

DISCLOSURE OF THE INVENTION

Problems to be Solved by the Invention

In an actual soccer match, a player A of an attack side team may move (action) in a way referred to as "pull away". That is, the player A may move so as to disappear from the view of a player B of the defense side team, who covers the player A. In other words, the player A may move to a position which cannot be captured, together with the ball at the same time, by the view of the player B. In this case, the player B loses sight of the player A, and thus, in a case such as when the player A receives the ball, may delay in taking an action to respond to (defends against) the player A. As a result, the player A having received the ball can take a subsequent action free from being blocked by the player B. With preferable production of a picture by the game device, in which the player B, e.g., loses sight of the player A having moved as described above and thus delays in responding to (defending against) the player A, it is possible to provide the user with new excitement.

The present invention has been conceived in view of the above, and an object of the present invention is to provide a game device, a game device control method and an information storage medium capable of showing a picture in which a first game character loses sight of a second game character having moved so as to disappear from the view of the first game character and thus delays in responding to (defending against) the second game character.

Means for Solving the Problems

In order to achieve the above described object, according to one aspect of the present invention, there is provided a game device for displaying a game screen image showing a picture of a game space where a plurality of first game characters and a second game character are placed, comprising: operation target selection means for selecting an operation target character from among the plurality of first game characters; and operation target control means for changing a state of the first game character selected as the operation target character by the operation target selection means, in the game space, based on a signal input from an operation means, wherein the operation target selection means includes determination means for determining, for at least one of the plurality of first game characters, whether or not a position of the second game character is included in a determination target area in the game space, the determination target area determined based on a position and orientation of the first game character, and selection restriction means for restricting, in the case where it is determined that the position of the second game character is included in the determination target area determined based on the position and orientation of the first game character, selection of that first game character by the operation target selection means.

According to another aspect of the present invention, there is provided a control method for controlling a game device for displaying a game screen image showing a picture of a game space where a plurality of first game characters and a second game character are placed, comprising: an operation target selection step of selecting an operation target character from among the plurality of first game characters; and an operation target control step of changing a state of the first game character selected as the operation target character by the operation target selection step, in the game space, based on a signal input from an operation means, wherein the operation target selection step includes a determination step of determining, for at least one of the plurality of first game characters, whether or not a position of the second game character is included in a determination target area in the game space, the determination target area being determined based on a position and orientation of the first game character, and a selection restriction step of restricting, in the case where it is determined that the position of the second game character is included in the determination target area determined based on the position and orientation of the first game character, selection of that first game character at the operation target selection step.

According to still another aspect of the present invention, there is provided a program for causing a computer, such as a personal computer, a consumer game device, a portable game device, a commercial game device, a portable phone, a personal digital assistant (PDA), and so forth, to function as a game device for displaying a game screen image showing a picture of a game space where a plurality of first game characters and a second game character are placed, comprising: operation target selection means for selecting an operation target character from among the plurality of first game characters; and operation target control means for changing a state of the first game character selected as the operation target character by the operation target selection means, in the game space, based on a signal input from an operation means, wherein the operation target selection means includes determination means for determining, for at least one of the plurality of first game characters, whether or not a position of the second game character is included in a determination target area in the game space, the determination target area being determined based on a position and orientation of the first game character, and selection restriction means for restricting, in the case where it is determined that the position of the second game character is included in the determination target area determined based on the position and orientation of the first game character, selection of that first game character by the operation target selection means.

According to yet another aspect of the present invention, there is provided an information storage medium recording the above described program. According to yet another aspect of the present invention, there is provided a program distribution device including an information storage medium recording the above described program, for reading the program from the information storage medium and distributing. According to yet another aspect of the present invention, there is provided a program distribution method for reading the above described program from an information storage medium recording the above described program, and distributing.

The present invention relates to a game device for showing a game screen image showing a picture of a game space where a plurality of first game characters and a second game character are placed. The "game space" includes a three dimensional game space formed using three coordinate elements and a two dimensional game space formed using two coordinate elements. According to the present invention, an operation target character is selected from among the plurality of first game characters. The state of the first game character selected as an operation target character in the game space is changed according to an operation signal input from the operation means. More particularly, according to the present invention, for at least one of the plurality of first game characters, whether or not the position of the second game character is included in a determination target area in the game space, determined based on the position and orientation of the first game characters, is determined. In the case where it is determined that the position of the second game character is included in the determination target area in the game space determined based on the position and orientation of the first game character, selection of the first game character as an operation target character is restricted. According to the present invention, a picture in which a first game character loses sight of a second game character having moved so as to disappear from the view of the first game character, and thus delays in responding to the second game character, can be preferably produced.

Also, in one embodiment of the present invention, the selection restriction means may restrict, in the case where it is determined that the position of the second game character is included in the determination target area determined based on the position and orientation of the first game character, selection of that first game character by the operation target selection means during a predetermined restriction period of time.

Also, in one embodiment of the present invention, the operation target selection means may select the operation target character from among the plurality of first game characters according to selection orders set on the plurality of respective first game characters. The selection restriction means may delay, in the case where it is determined that the position of the second game character is included in the determination target area determined based on the position and orientation of the first game character, the selection order set on that first game character.

Also, in one embodiment of the present invention, the operation target selection means may include means for selecting, in the case where it is determined that the position of the second game character is included in the determination target area determined based on the position and orientation of the first game character selected as the operation target character, another first game character from among the plurality of first game characters as the operation target character.

Also, in one embodiment of the present invention, the game device according the present invention may further comprise distinctive display means for distinctively displaying, in the case where it is determined that the position of the second game character is included in the determination target area determined based on the position and orientation of the first game character, that first game character on a game screen.

BRIEF DESCRIPTION OF THE DRAWINGS

FIG. 8 is a diagram showing one example of a state in which player objects are placed;

FIG. 11 is a diagram showing one example of a player state table;

FIG. 12 is a diagram showing one example of operation target specifying data;

FIG. 14 is a diagram showing one example of a switching order table;

FIG. 18 is a flowchart showing an entire structure of a program distribution system according to another embodiment of the present invention.

BEST MODE FOR CARRYING OUT THE INVENTION

In the following, one example of an embodiment of the present invention will be described in detail with reference to the accompanying drawings. A game device according to an embodiment of the present invention is realized using, e.g., a consumer game device, a portable game device, a portable phone, a personal digital assistant (PDA), a personal computer, and so forth. Here, a case in which a game device according to an embodiment of the present invention is realized using a consumer game device will be described.

Figure 1:
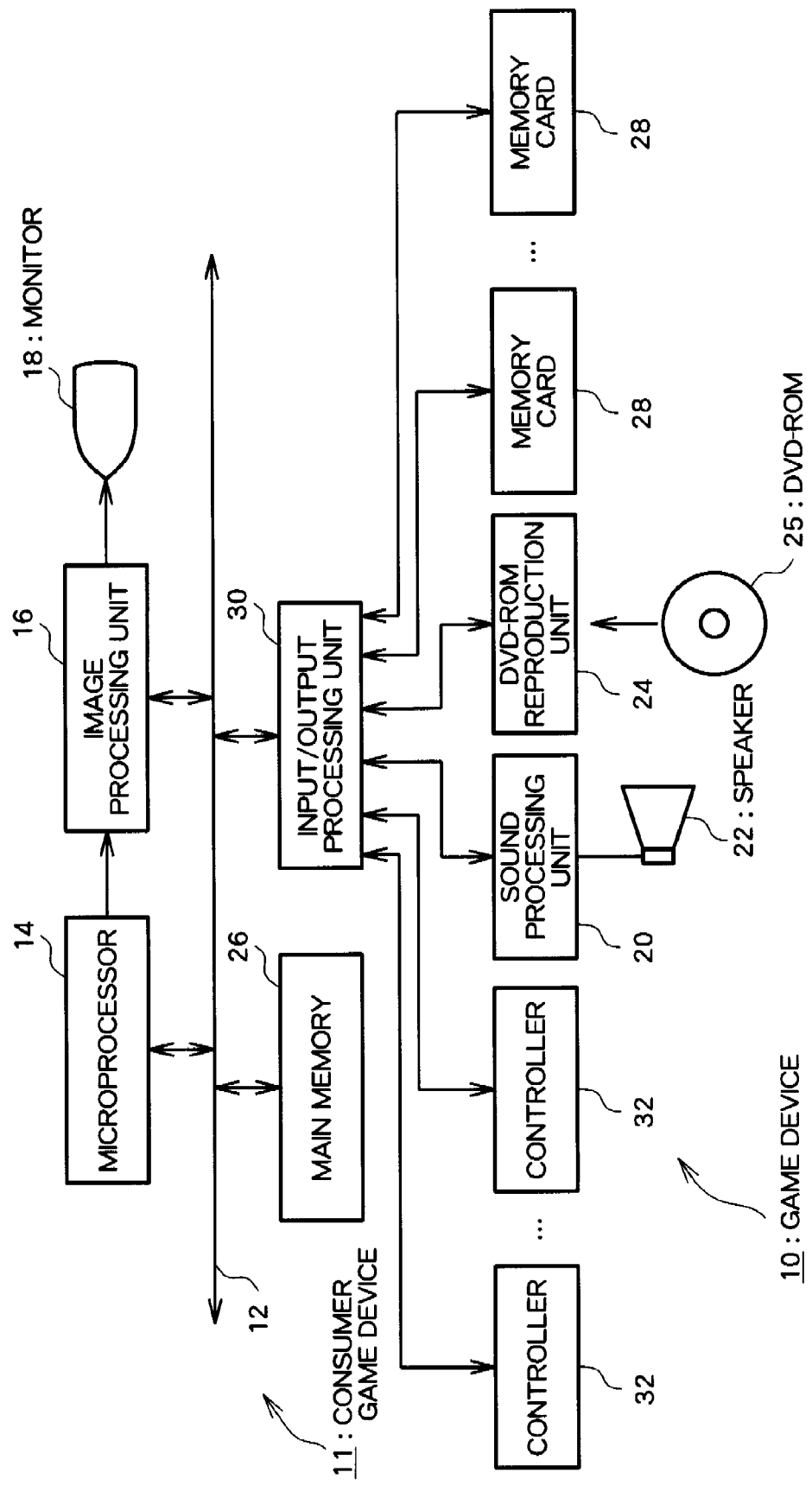
FIG. 1 is a diagram showing a complete structure of a game device according to an embodiment of the present invention.

FIG. 1 is a diagram showing an entire structure of a game device according to an embodiment of the present invention. The shown game device 10 comprises a consumer game device 11, a DVD-ROM 25, a memory card 28, a monitor 18, and a speaker 22. The DVD-ROM 25 and memory card 28 are information storage media. The DVD-ROM 25 and memory card 28 are mounted in the consumer game device 11. The monitor 18 and speaker 22 are connected to the consumer game device 11. For example, the monitor 18 may be a home-use television set receiver, and the speaker 22 may be a built-in speaker thereof.

The consumer game device 11 is a publicly known computer game system comprising a bus 12, a microprocessor 14, an image processing unit 16, a sound processing unit 20, a DVD-ROM reproduction unit 24, a main memory 26, an input/output processing unit 30, and a controller 32. The respective structural elements other than the controller 32 are accommodated in an enclosure.

The bus 12 is used for exchanging an address and/or data among the respective units of the consumer game device 11. The microprocessor 14, image processing unit 16, main memory 26, and input/output processing unit 30 are connected via the bus 12 for data exchange.

The microprocessor 14 controls the respective units of the consumer game device 11, based on an operating system stored in a ROM (not shown), a program read from the DVD-ROM 25, and data read from the memory card 28. The main memory 26 comprises a RAM, for example, into which a program read from the DVD-ROM 25 and/or data read from the memory card 28 is written when required. The main memory 26 is also used as a working memory of the microprocessor 14.

The image processing unit 16, which comprises a VRAM, renders a game screen image into the VRAM, based on image data sent from the microprocessor 14, then converts the rendered game screen image into a video signal, and outputs the video signal to the monitor 18 at a predetermined time.

The input/output processing unit 30 is an interface via which the microprocessor 14 accesses the sound processing unit 20, DVD-ROM reproduction unit 24, memory card 28, and controller 32. The sound processing unit 20, DVD-ROM reproduction unit 24, memory card 28, and controller 32 are connected to the input/output processing unit 30.

The sound processing unit 20 comprises a sound buffer, in which various sound data, such as game music, game sound effects, messages, and so forth, read from the DVD-ROM 25 is stored. The sound processing unit 20 reproduces the various sound data stored in the sound buffer and outputs via the speaker 22.

The DVD-ROM reproduction unit 24 reads a program from the DVD-ROM 25 according to an instruction from the microprocessor 14. It should be noted that, although the DVD-ROM 25 is used here to provide a program to the consumer game device 11, any other information storage medium, such as a CD-ROM, a ROM card, or the like, may be used instead. Alternatively, a program may be provided via a communication network, such as the Internet, or the like, from a remote place to the consumer game device 11.

The memory card 28 comprises a nonvolatile memory (for example, EEPROM, or the like). The consumer game device 11 has a plurality of memory card slots defined therein each for accepting a memory card 28, so that a plurality of memory cards 28 can be inserted into the consumer game device 11 at the same time. The memory card 28 can be removed from the memory card slot and stores various game data, such as saved data, or the like.

The controller 32 is a general purpose operation input means for inputting various game operations by a user. The input/output processing unit 30 scans the states of the respective units of the controller 32 at a constant cycle (e.g., every $\frac{1}{60}^{th}$ of a second) and sends an operation signal describing the scanning result to the microprocessor 14 via the bus 12. The microprocessor 14 determines the game operation by the user, based on the operation signal. The consumer game device 11 is adapted to connection to a plurality of controllers 32 so that the microprocessor 14 controls a game, based on the operation signals input from the respective controllers 32.

Figure 2:
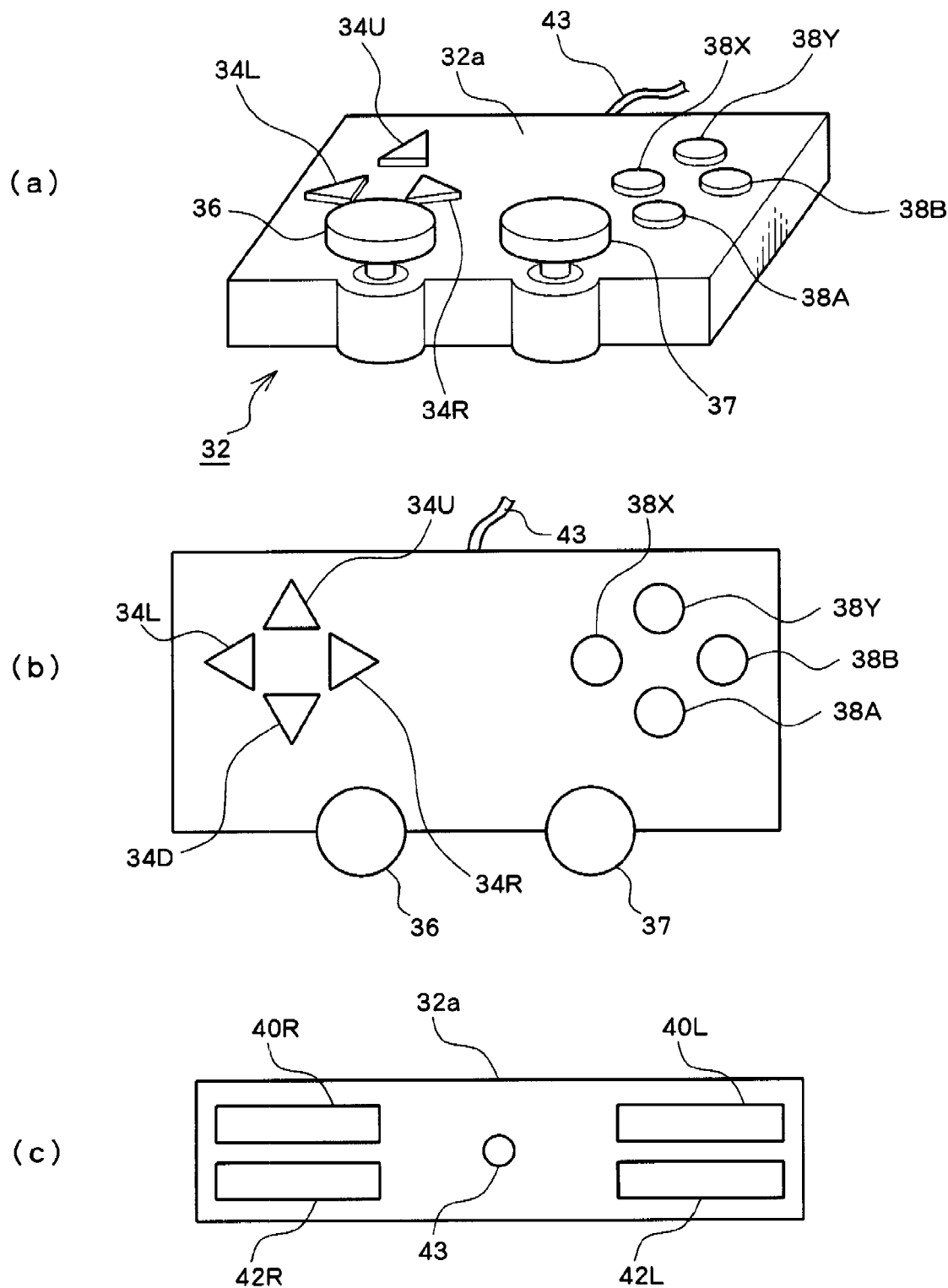
FIG. 2 is a diagram showing one example of a controller.

FIG. 2 is a diagram showing one example of the controller 32. FIG. 2 (a) is a perspective view of the controller 32. FIG. 2 (b) is a plan view of the controller 32. FIG. 2 (c) is a rear elevation of the controller 32. The controller 32 is connected via a controller cable 43 to the consumer game device 11. An upper direction button 34U, a lower direction button 34D, a left direction button 34L, a right direction button 34R, and a left operating stick 36 are formed on the left side of the front surface 32a of the controller 32, and buttons 38X, 38Y, 38A, 38B, and a right operating stick 37 are formed on the right side of the same. Further, buttons 40L, 40R are formed on the left and right sides, respectively, on the rear lateral surface of the controller 32 closer to the front surface 32a thereof, and the buttons 42L, 42R are similarly formed but closer to the bottom surface thereof.

The upper direction button 34U, lower direction button 34D, left direction button 34L, and right direction button 34R are generally used to designate a direction in which to move a game character. The buttons 38X, 38Y, 38A, 38B, 40L, 40R, 42L, 42R are used to carry out various game operations. The left operating stick 36 and right operating stick 37 are stick-like operating members standing on the enclosure surface of the controller 32. The left operating stick 36 and right operating stick 37 are free to be inclined from the upstanding position in all directions by a predetermined angle. The left operating stick 36 and right operating stick 37 are also used to designate a direction in which to move a game character.

In the above described game device 10, with execution of a game program read from, e.g., the DVD-ROM 25, a soccer match game between a user's operation target team and an opponent team is realized.

Figure 3:
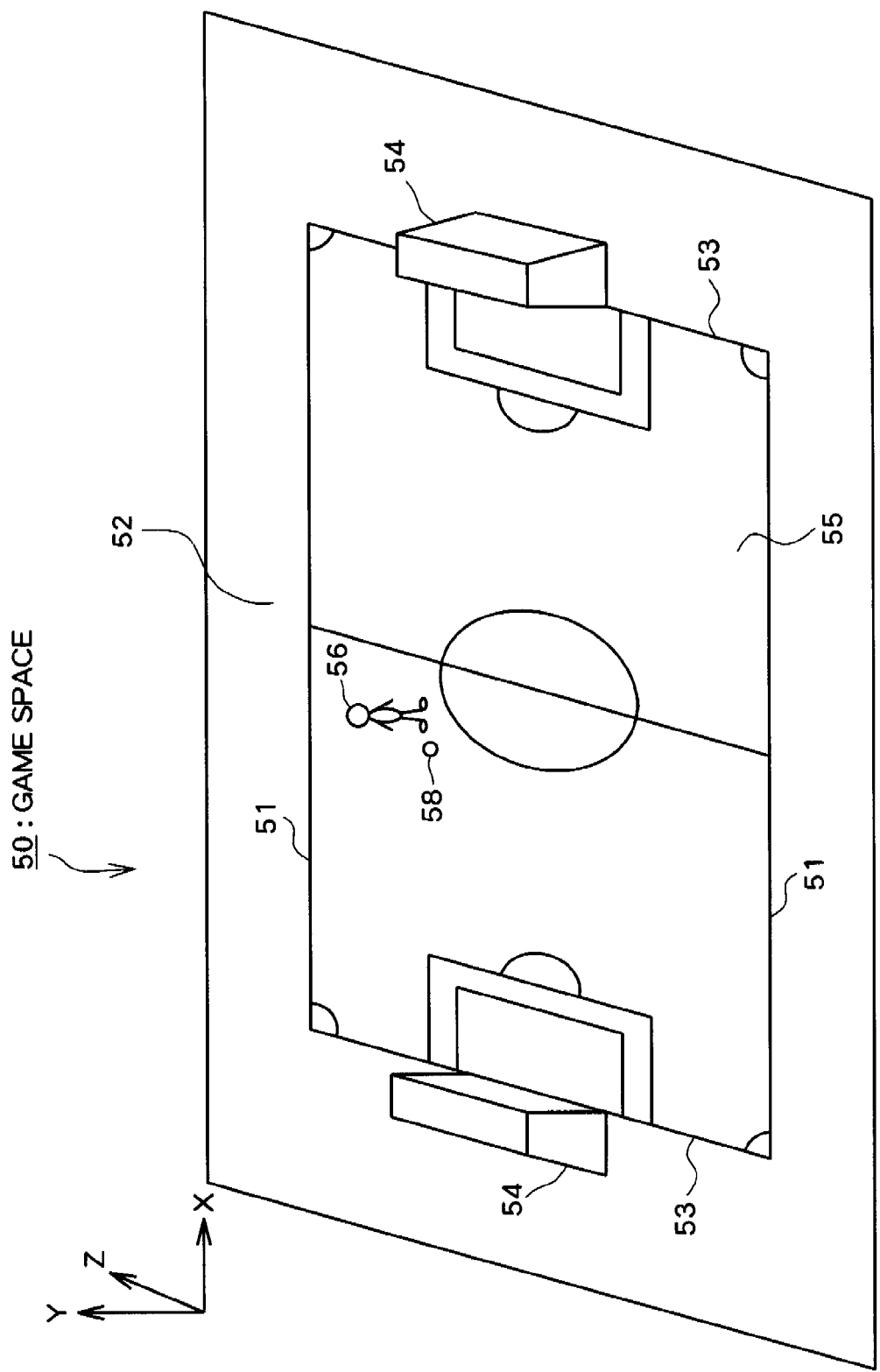
FIG. 3 is a diagram showing one example of a game space.

A game space (a virtual three-dimensional space) is created in the main memory 26 of the game device 10. FIG. 3 is a diagram showing one example of the game space. As shown, a field object 52 representing a soccer pitch and goal objects 54 representing goals are placed in the game space 50, constituting a soccer game field. The field object 52 is placed parallel to the XZ plane. A player object 56 representing a soccer player and a ball object 58 representing a soccer ball are placed on the field object 52. It should be noted that although only one player object 56 is shown in FIG. 3, eleven player objects 56 belonging to the user's operation target team and eleven player objects 56 belonging to the opponent team are actually placed.

One of the two goal objects 54 is associated with the operation target team, and the other with the opponent team. The ball object 58 having moved into the goal object associated with one of the teams makes a score event for the other team.

Any of the player objects 56 belonging to the operation target team serves as a user's operation target. The operating player object 56 which is the user's operation target carries out various operations according to the contents of the user's operation (contents of an operation carried out relative to the controller 32). The user's operation target is switched among the player objects 56 of the user's operation target team according to movement of the ball object 58 and/or the user's switching operation.

Player objects 56 other than the user's operation target player object 56 act according to an operation by a computer. Player objects 56 other than the user's operation target player object 56 include player objects 56 of the operation target team other than the user's operation target player object 56 and player objects 56 of the opponent team. Any of the four position kinds, namely, "forward (FW)", "midfielder (MF)", "defender (DF)", and "goal keeper (GK)" are assigned to the respective player objects 56. The player objects 56 other than the user's operation target player object 56 act according to the position kinds assigned thereto.

With the distance between the player object 56 and the ball object 58 becoming smaller than a predetermined distance (a ball holding determination reference distance), the player object 56 is made associated with the ball object 58 under a predetermined condition, and the ball object 58 with that association thereafter moves according to the movement of the player object 56. This is expressed as the player object 56 engaged in a dribble action. With the operation target player object 56 associated with the ball object 58, the user, by operating the controller 32, can cause the operation target player object 56 to kick the ball object 58. That is, the user can cause the operation target player object 56 to make a pass action, a shoot action, and so forth. With the operation target player object 56 not associated with the ball object 58, on the other hand, the user, by operating the controller 32, can cause the operation target player object 56 to carry out a shoulder tackle action, a sliding tackle action, and so forth. It should be noted that a state in which the player object 56 is associated with the ball object 58 is hereinafter referred to as "a state in which the player object 56 holds the ball object 58".

In the game space 50, a virtual camera which moves according to the movement of, e.g., the ball object 58 is set. A game screen image showing a picture of the game space 50 viewed from the virtual camera is shown on the monitor 18.

Figure 4:
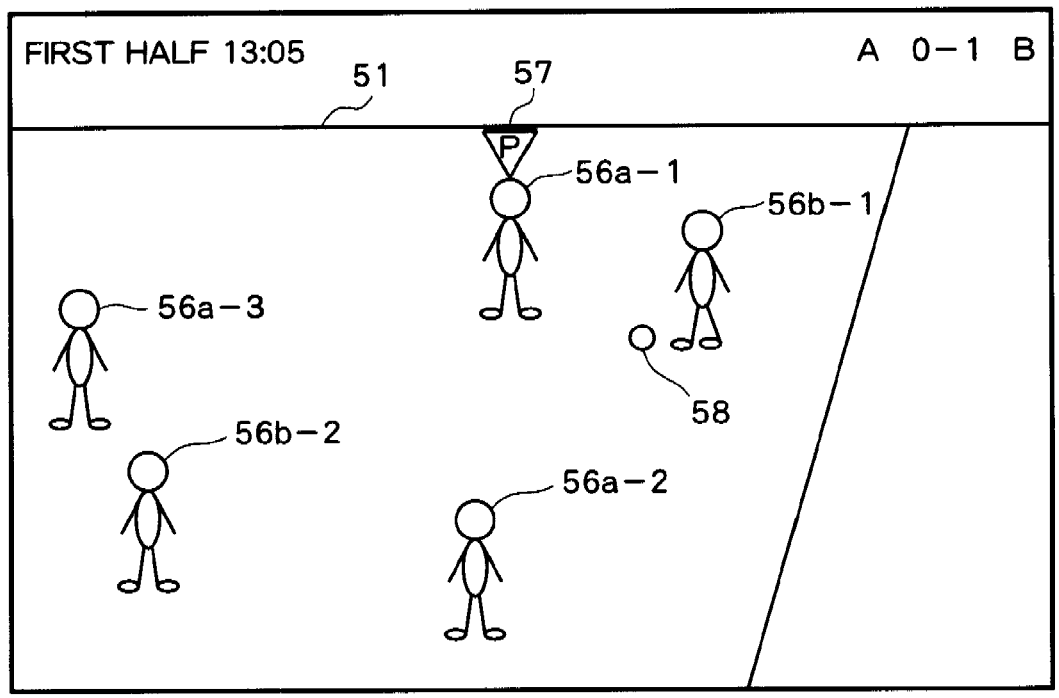
FIG. 4 is a diagram showing one example of a game screen image.

FIG. 4 shows one example of a game screen image shown on the monitor 18. The game screen image shows a picture in an area in the game space 50, the area being specified based on the position (a viewpoint position) and orientation (a viewing direction) of the virtual camera. In the shown game screen image, player objects 56a-1, 56a-2, 56a-3 of the user's operation target team and player objects 56b-1, 56b-2 of the opponent team are shown. In addition, an operation target player indicator mark 57 is shown above the player object 56a-1 in the game screen image. The operation target player indicator mark 57 is used to distinctively indicate the user's operation target player object 56, so that by reference to the operation target player indicator mark 57, the user can instantly know which player object 56 is an operation target. In addition, scores of the respective teams and the period of time elapsed after the match begins are also shown on the game screen. The user's operation target team is identified as "team A" and the opponent team as "team B" in the shown game screen image. The user, by operating the controller 32 while looking at the game screen image shown on the monitor 18, makes an action instruction (e.g., a movement instruction, a dribble instruction, a pass instruction, a shoot instruction, and so forth) concerning the operation target player object 56.

In response to the user's carrying out an operation target switching operation (pressing the button 40L, in this embodiment), in principle, the user's operation target is switched to another player object 56 according to a predetermined switching order. In this embodiment, the operation target switching order is determined based on the distances between the ball object 58 and the respective player objects 56 of the operation target team. More specifically, the switching order is determined such that a player object 56 located closer to, or having a shorter distance to, the ball object 58 has higher priority. Suppose that the distances L1, L2, L3 between the ball object 58 and the respective player objects 56a-1, 56a-2, 56a-3, respectively, in the state shown in FIG. 4, hold a relationship L1<L2<L3, for example. In this case, in response to an operation target switching operation, the user's operation target is switched to the player object 56a-2, which has the second shortest distance to the ball object 58 after the player object 56a-1 among the player objects 56 of the operation target team. In response to further operation target switching operation, the user's operation target is switched to the player object 56a-3, which has the third shortest distance to the ball object 58 after the player object 56a-2 among the player objects 56 of the operation target team.

Figure 5:
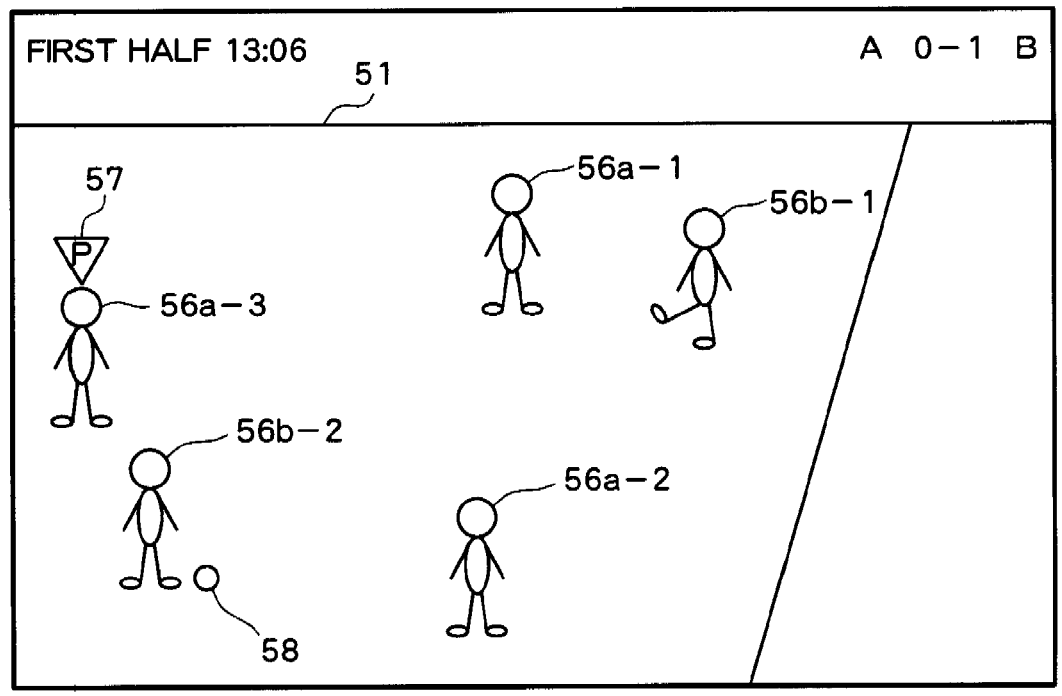
FIG. 5 is a diagram showing one example of a game screen image.

When the distances between the ball object 58 and the respective player objects 56 of the operation target team are changed as the ball object 58 moves or the like, the switching order is re-determined. In this case, on principle, the user's operation target is switched to the player object 56 located closest to, or having the shortest distance to, the ball object 58 among the player objects 56 of the operation target team. For example, suppose that the player object 56b-1 passes the ball object 58 to the player object 56b-2 in the state shown in FIG. 4, and the distances L1, L2, L3 between the ball object 58 and the respective player objects 56a-1, 56a-2, 56a-3, respectively, resultantly hold L3<L2<L1. In this case, the user's operation target is switched to the player object 56a-3 (see FIG. 5).

In the following, a technique for preferably producing an image of a picture in which a defender player object 56 of the user's operation target team, when a forward player object 56 of the opponent team moves so as to disappear from the view of the defender player object 56, loses the forward player object 56 and resultantly delays in responding to (defending or the like) the forward player object 56 is described.

In the game device 10, when the operation target team is on the defense side and there exists a player object 56 satisfying all of the conditions 1 to 3 described below among the player objects 56 (first game characters) of the operation target team, switching to that player object 56 as an operation target is restricted. Note that a state in which the operation target team is on the defense side refers to a state in which the opponent team holds the ball object 58.

[Condition 1] The position kind is a defender.
[Condition 2] The position is within an area in front of the goal (goal front area) of the operation target team.
[Condition 3] A forward player object 56 (second game character) of the opponent team is present within a dead angle area.

Figure 6:
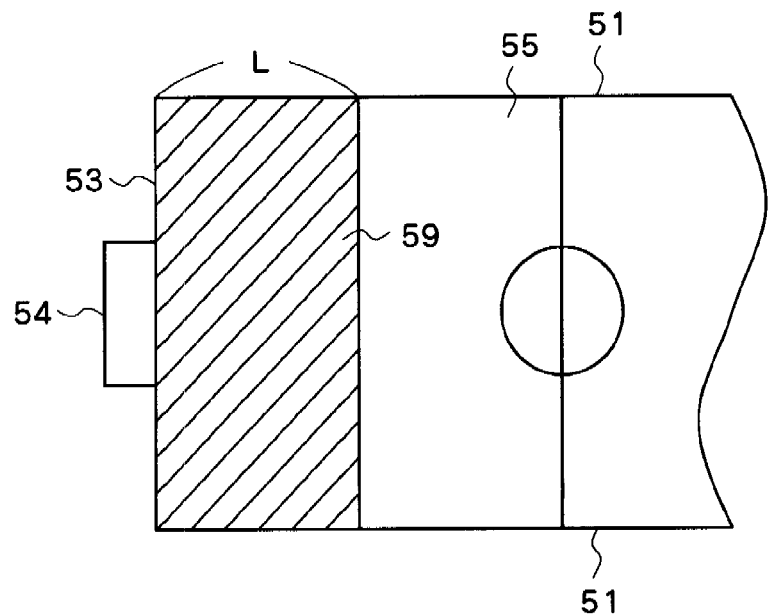
FIG. 6 is a diagram showing a goal front area.

FIG. 6 is a diagram explaining a goal front area. As shown, the goal front area 59 of the operation target team is an area within the court 55 and within a predetermined distance L from the goal line 53 on the goal object 54 side of the operation target team. Note that the court 55 is an area enclosed by the touch lines 51 and goal lines 53.

Figure 7:
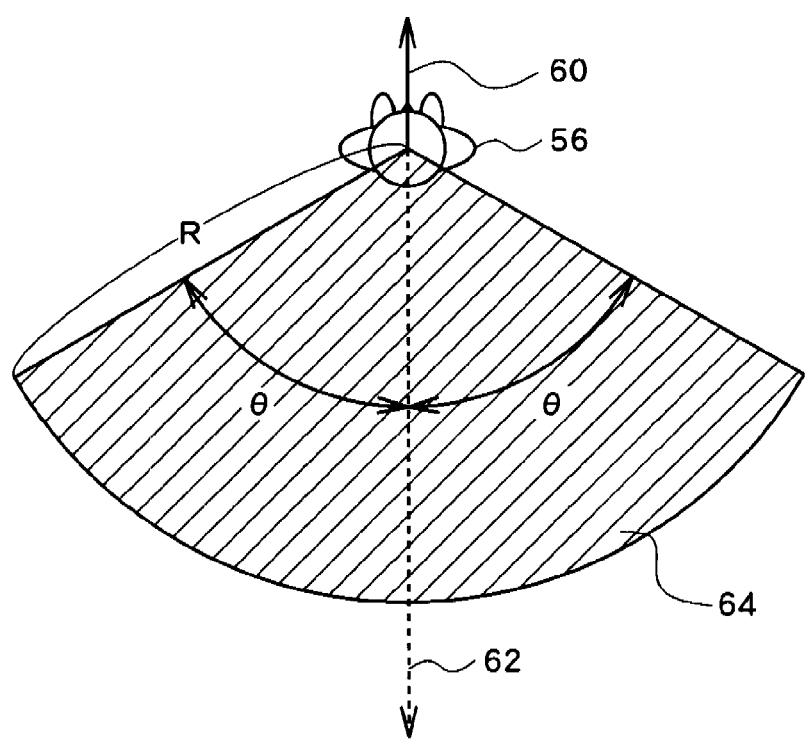
FIG. 7 is a diagram showing a dead angle area.

FIG. 7 is a diagram explaining a dead angle area (determination target area). As shown, the dead angle area 64 of a player object 56 is a fan-like area with the angle formed by the rear direction 62 (the direction opposite from the reference direction 60) of the player object 56 and a direction extending from the player object 56, being equal to or smaller than a predetermined reference angle ($\theta$), and the distance (the distance on the XZ plane system) from the player object 56 being equal to or shorter than a predetermined reference distance (R). Note that the reference direction 60 of the player object 56 may be the direction in which the body of the player object 56 is directed or the head thereof is directed (or the viewing direction of the player object 56). As described above, the dead angle area 64 is an area defined based on the position of the player object 56, and moves according to the movement of the player object 56.

Figure 9:
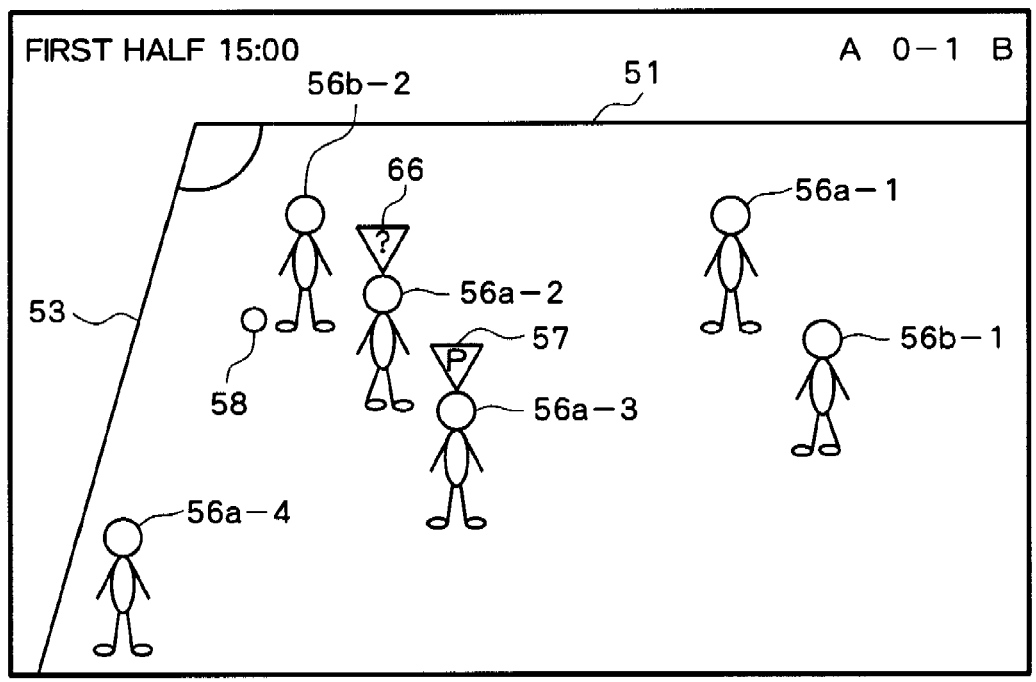
FIG. 9 is a diagram showing one example of a game screen image.

Here, by reference to FIGS. 8 and 9, operation target switching restriction will be described in further detail. FIGS. 8(a) and 8(b) show one example of the states (positions and reference directions 60) of the player objects 56 and ball object 58. FIG. 9 shows one example of a game screen image shown on the monitor 18.

In the state shown in FIG. 8 (a), the player object 56b-1 holds the ball object 58. In the above, the player objects 56a-1, 56a-2, 56a-3, 56a-4 belong to the operation target team, while the player objects 56b-1, 56b-2 belong to the opponent team. The player object 56a-2 is located within the goal front area 59 of the operation target team, and the position kind is a defender. The player object 56b-2 is located within the dead angle area 64 of the player object 56a-2, and the position kind is a forward. That is, the player object 56a-2 satisfies the above described conditions 1 to 3.

FIG. 8(b) shows a state after the player object 56b-1 in the state shown in FIG. 8(a) passes the ball object 58 to the player object 56b-2. In the above, the distances L1, L2, L3, L4 between the ball object 58 and the respective player objects 56a-1, 56a-2, 56a-3, 56a-4, respectively, hold a relationship L2<L3<L1<L4. In this case, in general, the user's operation target is switched to the player object 56a-2. However, switching to the player object 56a-2 as an operation target is restricted as the player object 56a-2 satisfies all of the above described conditions 1 to 3. That is, the user is restricted from operating the player object 56a-2 to respond to (defend against) the player object 56b-2 of the opponent team. In this case, the user's operation target is switched to the player object 56a-3, which is located second closest to the ball object 58 after the player object 56a-2 among those of the operation target team and does not satisfy at least one of the above described conditions 1 to 3. That is, the user is required to operate another player object 56 (e.g., the player object 56a-3) to respond to (defend against) the player object 56b-2 of the opponent team.

FIG. 9 shows one example of a game screen image to be shown on the monitor 18 with respect to the state shown in FIG. 8(b). As shown, the operation target player indicator mark 57 is shown above the operation target player object 56a-3 in the game screen image, and the switching restricted player indicator mark 66 is shown above the player object 56a-2. By referring to the switching restricted player indicator mark 66, the user can instantly know that switching to the player object 56a-2 as an operation target is restricted. That is, the user can know at a glance that they cannot operate the player object 56a-2 to respond to (defend against) the player object 56b-2 of the opponent team.

As described above, an image showing a picture in which the player object 56a-2 loses the player object 56b-2 having moved so as to disappear from the view of the player object 56a-2 and thus delays in responding to (defending against) the player object 56b-2 in the state shown in FIGS. 8(a) and 8(b) is preferably produced.

Figure 10:
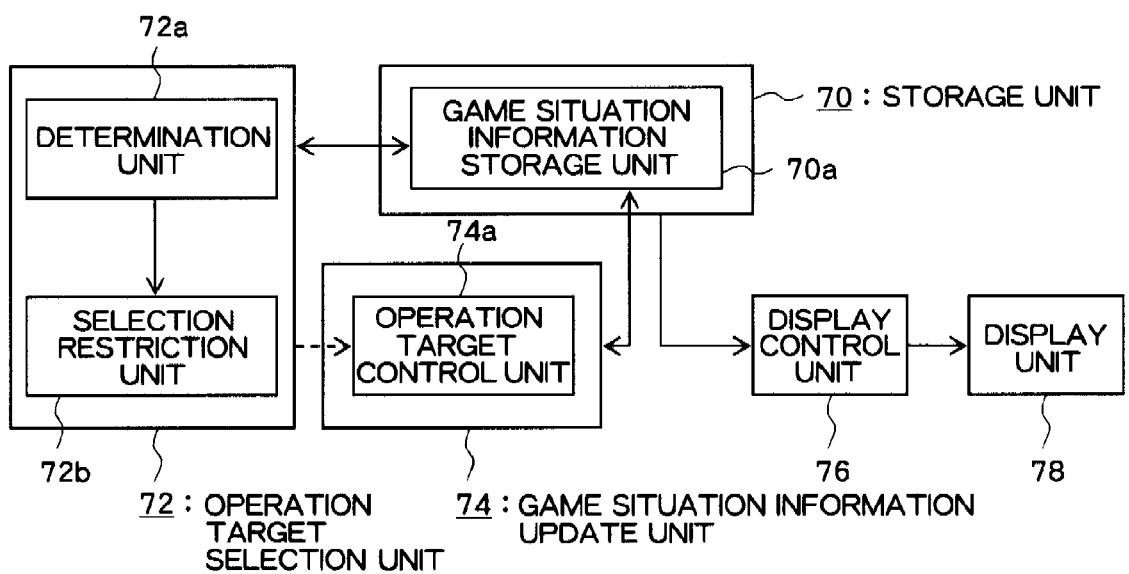
FIG. 10 is a functional block diagram of a game device.

In the following, a function realized in the game device 10 will be described. FIG. 10 is a functional block diagram mainly showing functions according to the present invention among those realized in the game device 10. As shown, the game device 10 comprises, in terms of functions, a storage unit 70, an operation target selection unit 72, a game situation information update unit 74, a display control unit 76, and a display unit 78. These functions are realized in the game device 10 by carrying out a game program read from the DVD-ROM 25.

[1. Storage Unit]

The storage unit 70 is realized mainly using the main memory 26 and/or DVD-ROM 25. In the storage unit 70, data (data specifying the coordinates of the respective vertexes of the polygons forming various objects) indicating the shapes of various objects, such as, e.g., the player object 56, ball object 58, and so forth is stored. In addition, for example, in the storage unit 70, motion data describing change in the posture of the player object 56 taking various actions is also stored. Further, for example, in the storage unit 70, ability parameters (a pass ability parameter and so forth) of the respective player objects 56 placed in the game space 50 are stored. Each ability parameter is expressed by any numeric value between 0 and 100, with an ability parameter with a higher numeric value indicating higher ability.

The storage unit 70 includes a game situation information storage unit 70a. In the game situation information storage unit 70a, game situation information describing situation of a game is stored. Game situation information includes, for example, information describing the states of the respective player objects 56, ball object 58, and virtual camera placed in the game space 50. "Information describing the state of a player object 56" includes information describing position, posture, movement direction, and moving speed of each player object 56 in the game space 50, information describing the position kind of the player object 56, and information describing whether or not the player object 56 holds the ball object 58. "Information describing the state of the ball object 58" includes information describing the position, movement direction, and moving speed of the ball object 58 in the game space 50. "Information describing the state of the virtual camera" includes, e.g., information describing the position (a viewpoint position), posture (a viewing direction), and an angle of view, and so forth, of the virtual camera in the game space 50. Game situation information includes, e.g., information indicating the player object 56 which is a user's current operation target and information describing situation of the match, such as scores of the respective teams, a period of time elapsed after the match begins, and so forth.

In this embodiment, in the game situation information storage unit 70a, a player state table showing the states of the respective player objects 56 of the respective teams is stored. FIG. 11 shows a part of the player state table. The shown player state table includes "player ID", "position kind", "position", "orientation", and "ball holding flag" fields. In the "player ID" field, a player ID for uniquely identifying each player object 56 placed in the game space 50 is stored. Note that a player object 56 having a player ID beginning with "A" belongs to the operation target team (team A) and a player object 56 having a player ID beginning with "B" belongs to the operation target team (team B). In the "position kind" field, the position kind of a player object 56 is stored. In the "position" field, the position coordinates of a representative point (e.g., a central point) of a player object 56 in the game space 50 are stored. In the "orientation" field, a unit vector indicating the reference direction 60 (e.g., a front direction or viewing direction) of a player object 56 is stored. In the "ball holding flag" field, information indicating whether or not a player object 56 holds the ball object 58 is stored. When the player object 56 does not hold the ball object 58, the "ball holding flag" field is set to 0, and when the player object 56 holds the ball object 58, the "ball holding flag" field is set to 1.

Further, in the game situation information storage unit 70a, operation target specifying data for specifying the user's current operation target player object 56 is additionally stored. FIG. 12 shows one example of the operation target specifying data. The shown operation target specifying data is data indicating the player ID (operation target player ID) of the user's current operation target player object 56. The operation target specifying data is updated by the operation target selection unit 72.

[2. Operation Target Selection Unit]

The operation target selection unit 72 is realized mainly using the microprocessor 14 and main memory 26. Every arrival of a predetermined operation target selection time, the operation target selection unit 72 selects the user's operation target from among the player objects 56 of the operation target team (a plurality of first game characters). The operation target selection time refers to a time or the like at which an operation target switching operation is carried out by the user or the operation target switching order is changed as the ball object 58 moves (e.g., through pass) or the like.

When the user's operation target is selected from among the player objects 56 of the operation target team, the operation target selection unit 72 updates the operation target player ID contained in the operation target specifying data to the player ID of the selected player object 56.

The operation target selection unit 72 includes a determination unit 72a. The determination unit 72a determines whether or not each of the respective player objects 56 of the operation target team satisfies all of the above described conditions 1 to 3.

The operation target selection unit 72 additionally includes a selection restriction unit 72b. The selection restriction unit 72b restricts selection of an operation target by the operation target selection unit 72, according to the result of determination by the determination unit 72a. In this embodiment, when there exists a player object 56 which satisfies all of the above described conditions 1 to 3 among the player objects 56 of the operation target team, the selection restriction unit 72b restricts selection of the player object 56 by the operation target selection unit 72.

[3. Game Situation Information Update Unit]

The game situation information update unit 74 is realized mainly using the microprocessor 14. The game situation information update unit 74 updates game situation information stored in the game situation information storage unit 70a.

The game situation information update unit 74 includes an operation target control unit 74a. The operation target control unit 74a updates information describing the state of the user's operation target player object 56 (a player object 56 selected as an operation target by the operation target selection unit 72), based on an operation signal input from the controller 32.

Also, for example, when a dribble instruction operation, a pass instruction operation, a shoot instruction operation, or the like is carried out in a state in which the player object 56 holds the ball object 58, the game situation information update unit 74 updates the information describing the state of the ball object 58, based on an operation signal input from the controller 32. Further, for example, the game situation information update unit 74 updates the information describing the states of the player objects 56 other than the user's operation target player object 56 according to a predetermined algorithm. Still further, for example, when a player object 56 other than the user's operation target player object 56 takes a dribble action, a pass action, a shoot action, or the like, for example, the game situation information update unit 74 updates the information describing the state of the ball object 58.

[4. Display Control Unit and Display Unit]

The display control unit 76 is realized mainly using the microprocessor 14 and image processing unit 16, and the display unit 78 is realized mainly using the monitor 18. The display control unit 76 produces a game screen image showing a picture obtained by viewing from a virtual camera "the game space 50 where the respective player objects 56 and ball object 58 are placed, based on game situation information stored in the game situation information storage unit 70a", and shows the produced game screen image on the display unit 78.

When the operation target team is on the defense side (that is, when the opponent team holds the ball object 58), the display control unit 76 (distinctive display means) distinctively shows on the game screen the player object 56 satisfying all of the above described conditions 1 to 3 among the player objects 56 of the operation target team. For example, the display control unit 76 shows a predetermined image in a position based on the position where the player object 56 is shown on the game screen, to thereby distinctively display the player object 56. Alternatively, the display control unit 76 shows the player object 56 in a manner different from that for other player objects 56, to thereby distinctively display the player object 56. More specifically, the display control unit 76 shows the player object 56 blinking or in a predetermined color, to thereby distinctively display the player object 56. In this embodiment, when the operation target team is on the defense side (that is, when the opponent team holds the ball object 58), the display control unit 76 shows the switching restricted player indicator mark 66 above the player object 56 satisfying all of the above described conditions 1 to 3 among the player objects 56 of the operation target team (FIG. 9).

In the following, a process to be carried out in the game device 10 will be described.

Figure 13:
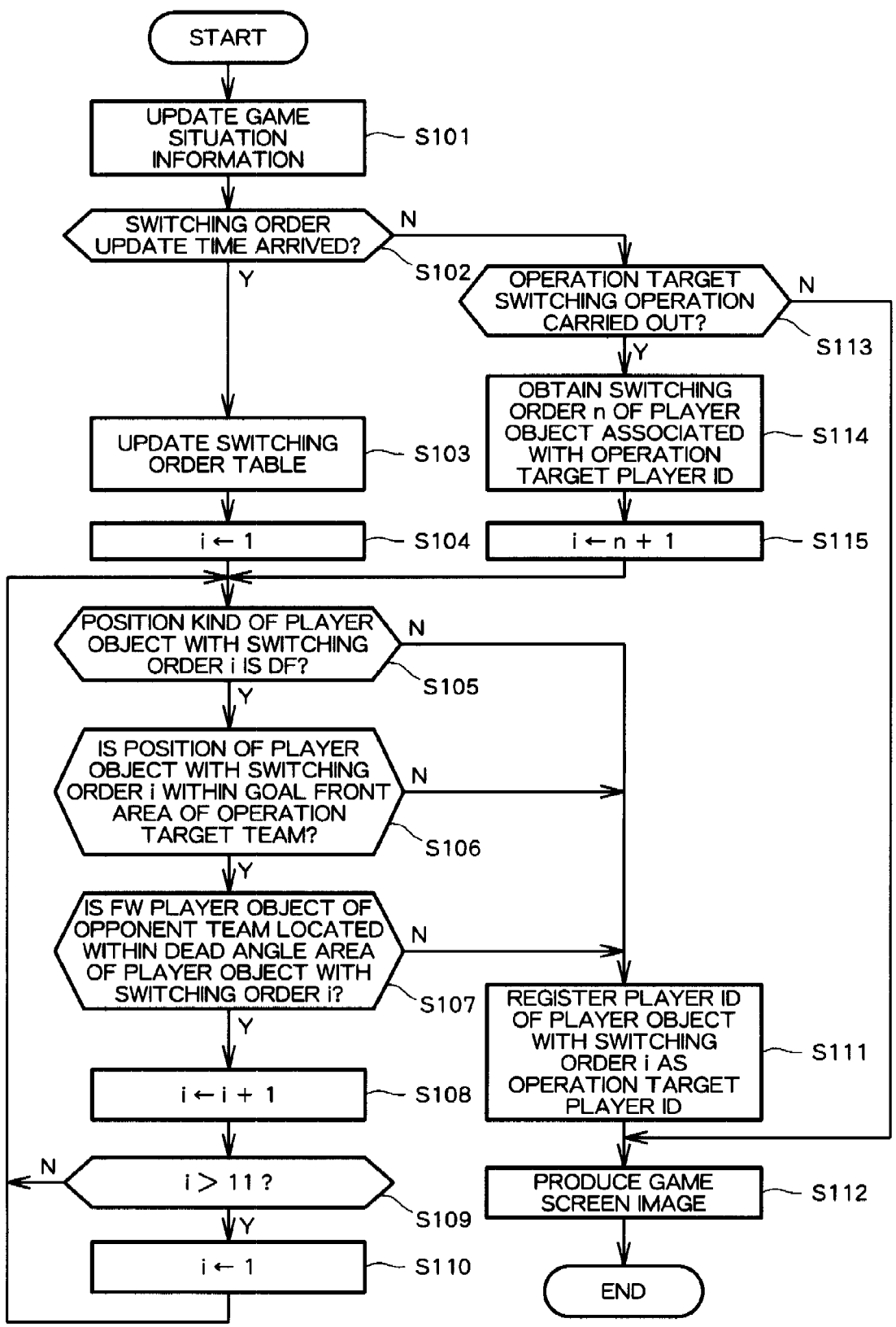
FIG. 13 is a flowchart of a process to be carried out in the game device.

FIG. 13 is a flowchart mainly concerning a process according to the present invention among those carried out by the game device 10 every predetermined period of time (e.g., $\frac{1}{60}^{th}$ of a second) in the case where the operation target team is on the defense side (when any player object 56 of the opponent team holds the ball object 56). A game program for causing the microprocessor 14 to carry out this process is read from the DVD-ROM 25 in the game device 10, and carried out by the microprocessor 14, whereby the above described respective functional blocks (FIG. 10) are realized.

As shown in FIG. 13, initially, game situation information stored in the game situation information storage unit 70a is updated (S101). For example, the position and orientation (FIG. 11) of the user's operation target player object 56 are updated, based on an operation signal input from the controller 32. Note that the user's operation target player object 56 is specified by reference to the operation target specifying data (FIG. 12). Further, for example, the positions and orientations (FIG. 11) of the respective player objects 56 other than the user's operation target player object 56 are updated based on the position kinds thereof according to a predetermined algorithm. Still further, for example, in the case where a player object 56 of the opponent team takes a dribble action, a pass action, a shoot action, or the like, the position or the like of the ball object 58 is updated. Yet further, for example, in the case where a player object 56 holding the ball object 58 is changed to another player object 56, the ball holding flag (FIG. 11) is updated.

Thereafter, whether or not a switching order update time has arrived is determined (S102). A switching order update time is a time at which the switching orders of the respective player objects 56 of the operation target team need to be changed as the distances between the ball object 58 and the respective player objects 56 of the operation target team are changed as a result of the ball object 58 being passed among the player objects 56 of the opponent team.

Figure 14:
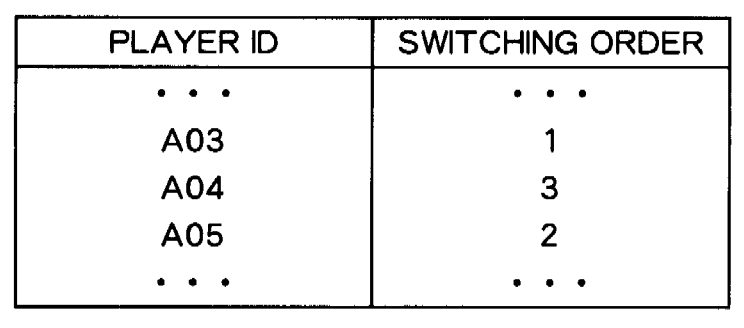

In the case where it is determined that a switching order update time has arrived, the switching order table is updated (S103). The switching order table is a table showing switching orders of the respective player objects 56 of the operation target team. FIG. 14 shows one example of the switching order table. At this step, the distances between the ball object 58 and the respective player objects 56 of the operation target team are calculated, and the switching orders of the respective player objects 56 of the operation target team are determined such that a player object 56 having a shorter distance from the ball object 58 has higher priority in the switching. That is, the switching order of the player object 56 located closest to the ball object 58 is determined as 1, and that of the player object 56 located farthest from the ball object 58 is determined as 11.

After the process at S103, the variable i is initialized to one (S104). Then, whether or not the position kind of the player object 56 with the switching order $i^{th}$ is a defender is determined (S105). That is, whether or not the player object 56 with the switching order $i^{th}$ satisfies the above described condition 1 is determined. This determination is made based on the player state table (FIG. 11).

In the case where it is determined that the position kind of the player object 56 with the switching order $i^{th}$ is not a defender, the player object 56 is determined as the operation target, and the player ID thereof is registered as the operation target player ID (FIG. 12) (S111). Meanwhile, in the case where the position kind of the player object 56 with the switching order $i^{th}$ is a defender, whether or not the player object 56 is located within the goal front area 59 of the operation target team is determined (S106). That is, whether or not the player object 56 with the switching order $i^{th}$ satisfies the above described condition 2 is determined. This determination is also made based on the player state table (FIG. 11).

In the case where it is determined that the player object 56 with the switching order $i^{th}$ is not located within the goal front area 59 of the operation target team, the player object 56 is determined as the operation target, and the player ID thereof is registered as the operation target player ID (FIG. 12) (S111). On the other hand, in the case where the player object 56 with the switching order $i^{th}$ is located within the goal front area 59 of the operation target team, whether or not any "player object 56 of the opponent team, for which position kind is a forward" is located within the dead angle area 64 of the player object 56 is determined (S107). That is, whether or not the player object 56 with the switching order $i^{th}$ satisfies the above described condition 3 is determined.

More specifically, the following process is carried out with respect to the respective forward player objects 56 of the opponent team. That is, whether or not the angle formed by the "rear direction 62 of the player object 56 with the switching order $i^{th}$" and the "direction extending from the player object 56 with the switching order $i^{th}$ to the forward player object 56 of the opponent team" is equal to or smaller than a predetermined reference angle (θ) is determined. This determination is made based on the player state table (FIG. 11). Further, whether or not the distance between the player object 56 with the switching order $i^{th}$ and the forward player object 56 of the opponent team is equal to or shorter than a predetermined reference distance (R) is also determined. This determination is also made based on the player state table (FIG. 11). In the case where it is determined that the angle is equal to or smaller than the reference angle (θ) and the distance is equal to or shorter than the reference distance (R), it is concluded that the "player object 56 of the opponent team, for which position kind is a forward" is located within the dead angle area 64 of the player object 56 with the switching order $i^{th}$.

With the conclusion that a "player object 56 of the opponent team, for which position kind is a forward" is not located within the dead angle area 64 of the player object 56 with the switching order $i^{th}$, the player object 56 with the switching order $i^{th}$ is determined as an operation target, and the player ID of the player object 56 is registered as an operation target player ID (FIG. 12) (S111). On the other hand, with the conclusion that a "player object 56 of the opponent team, for which position kind is a forward" is located within the dead angle area 64 of the player object 56 with the switching order $i^{th}$, the player object 56 with the switching order $i^{th}$ is not selected as the operation target, and the value of the variable i is incremented (S108). In the above, in the case of the variable i larger than eleven, the variable i is updated to one (S109 and S110). Thereafter, the process at S105 is carried out again. That is, whether or not the subsequent player object 56 satisfies all of the above described conditions 1 to 3 is determined.

With determination at S102 that the switching order update time has not yet arrived (S102: N), whether or not an operation target switching operation has been carried out is determined (S113) Specifically, in this embodiment, whether or not the button 40L has been pressed is determined, based on an operation signal input from the controller 32. In the case where it is determined that an operation target switching operation has been carried out, the switching order n of the current operation target player object 56 is obtained (S114). The switching order n is obtained, based on the operation target specifying data (FIG. 12) and switching order table (FIG. 14). Thereafter, the variable i is updated to n+1 (S115) before the processes from S105 to S112 are carried out.

After the process at S111 or determination at S113 that an operation target switching operation is not carried out (S113: N), a game screen image is produced (S112). For example, an image showing a picture obtained by viewing from the virtual camera the "game space 50 where the respective player objects 56 and ball object 58 are placed, based on game situation information stored in the game situation information storage unit 70a" is rendered into the VRAM. Thereafter, the operation target player indicator mark 57 is overwritten into a predetermined position above the user's operation target player object 56 in the image rendered in the VRAM, with reference to the operation target specifying data (FIG. 12). Further, the switching restricted player indicator mark 66 is overwritten into a predetermined position above the player object 56 satisfying all of the above described conditions 1 to 3 among the player objects 56 of the operation target team in the image rendered in the VRAM. Still further, a score image and an elapsed time image are overwritten into the image rendered in the VRAM. As described above, a game screen image (FIG. 4, 5, 9, and so forth) is formed in the VRAM, and the game screen image formed in the VRAM is output at a predetermined time to the display unit 78.

According to the process shown in FIG. 13, switching to the player object 56 as an operation target, which satisfies the above described conditions 1 to 3 among the player objects 56 of the operation target team is restricted (see S105 to S107).

Also, according to the process shown in FIG. 13, the user's operation target is switched to another player object 56 (a player object 56 not satisfying the above described conditions 1 to 3) in the case where the user's operation target player object 56 satisfies the above described conditions 1 to 3. For example, assume that the player object 56b-2 moves into the dead angle area of the player object 56a-2 which is the user's operation target, as a result of which the state shown in FIG. 8 (a) is established. In this case, the user's operation target is switched from the player object 56a-2 to the player object 56a-3 in the case where a switching order update time arrives (in the case where, e.g., the player object 56b-1 passes the ball object 58 to the player object 56b-2).

Figure 15:
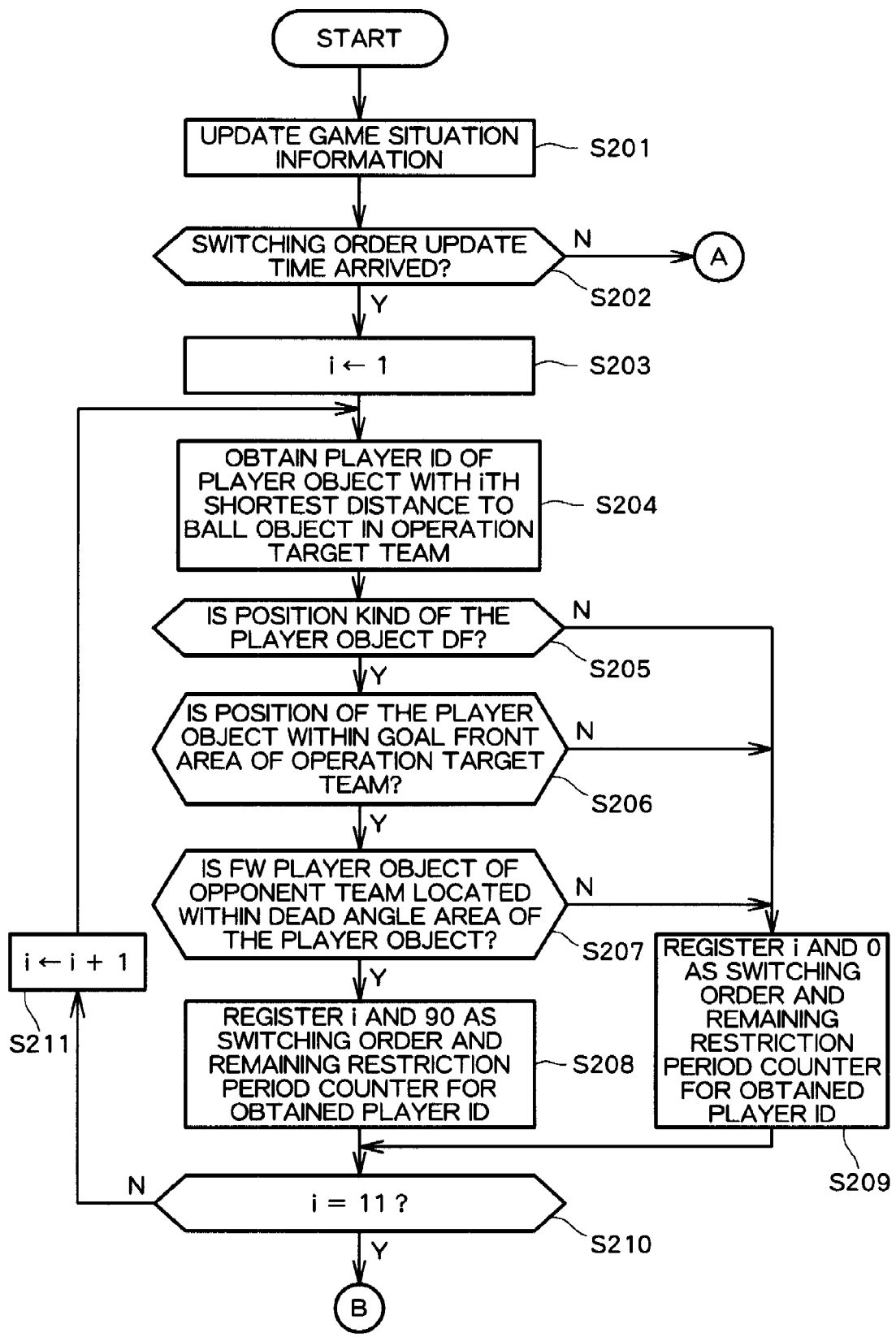
FIG. 15 is a flowchart of a process to be carried out in the game device.
Figures 16, 17:
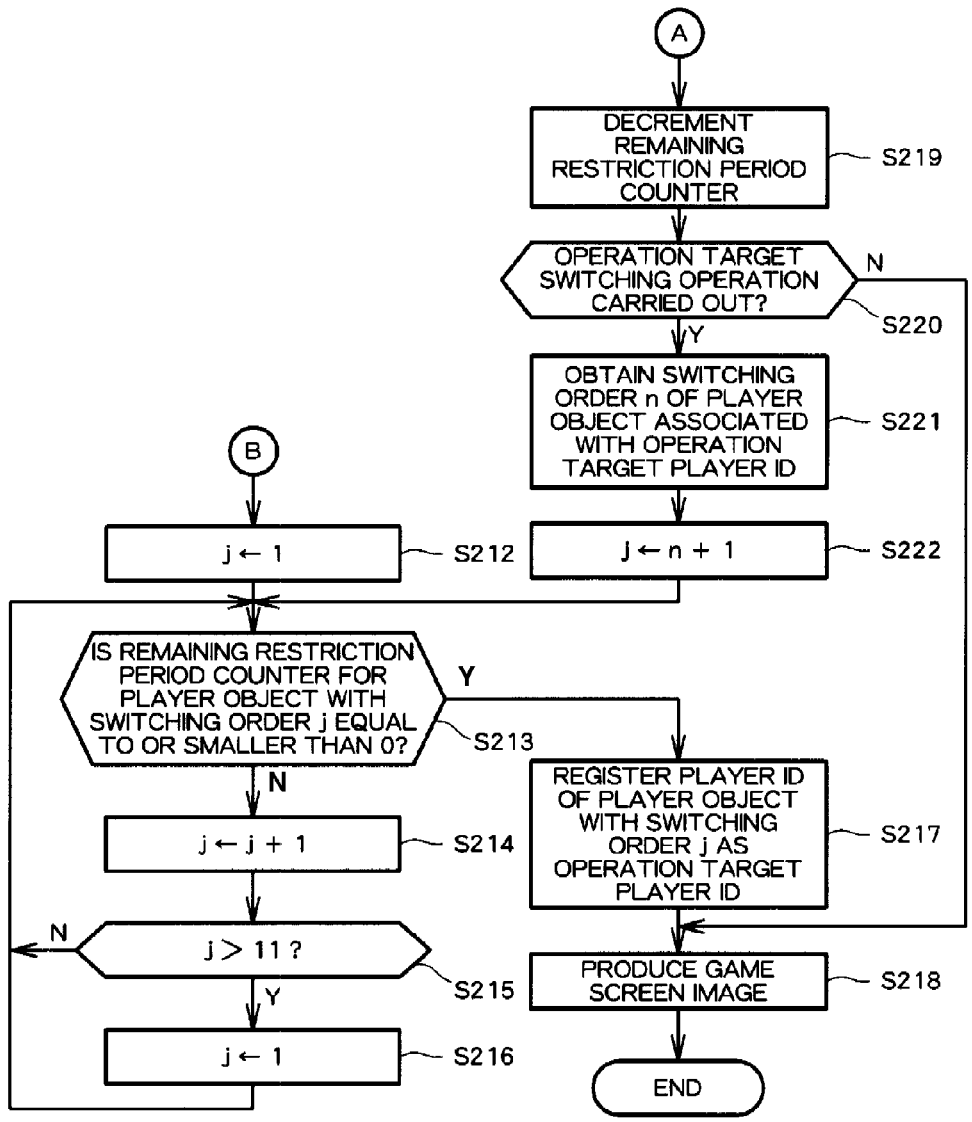
FIG. 16 is a flowchart of a process to be carried out in the game device.
FIG. 17 is a diagram showing one example of a switching order table.

Note that in the case where the operation target team is on the defense side (that is, any player object 56 of the opponent team holds the ball object 58), the process shown in, e.g., FIGS. 15 and 16 may be carried out in the game device 10 every predetermined period of time (e.g., $\frac{1}{60}^{th}$ of a second). A game program for causing the microprocessor 14 to carry out this process is read into the game device 10 from the DVD-ROM 25, and executed by the microprocessor 14, whereby the above described respective functional blocks are realized (FIG. 10).

As shown in FIG. 15, initially, the game situation information stored in the game situation information storage unit 70a is updated (S201). This process is carried out similar to the process at S101. Thereafter, whether or not a switching order update time has arrived is determined (S202). This process is carried out similar to the process at S102. In the case where it is determined that a switching order update time has arrived, a process to initialize the switching order table is carried out (S203 to S211).

FIG. 17 shows one example of a switching order table corresponding to this process. As shown, the switching order table is a table showing an order in which to switch (a switching order) each player object 56 of the operation target team and a remaining restriction period counter. Note that the remaining restriction period counter is information describing a remaining period of time during which the player object 56 remains restricted from being selected as an operation target, specifically, information indicating a remaining period of time in units of $1/60^{th}$ of a second in this embodiment.

In the switching order table initializing process, the variable i is initialized to one (S203). Thereafter, the player ID of a player object 56 with the distance to the ball object 58 being $i^{th}$ shortest among the player objects 56 of the operation target team is obtained (S204). This process is carried out based on the player state table (FIG. 11). Then, whether or not the position kind of the player object 56 (the player object 56 of the operation target team, with the distance to the ball object 58 being $i^{th}$ shortest) is a defender is determined (S205). This process is carried out similar to the process at S105.

In the case where it is determined that the position kind of the player object 56 is not a defender, the switching order corresponding to the player ID obtained at S204 in the switching order table (FIG. 17) is updated to the value of the variable i, and the remaining restriction period counter corresponding to the player ID obtained at S204 is updated to zero (S209). On the other hand, in the case where the position kind of the player object 56 is a defender, whether or not the player object 56 is located within the goal front area 59 of the operation target team is determined (S206). This process is carried out similar to the process at S106.

In the case where it is determined that the player object 56 is not located within the goal front area 59 of the operation target team, the switching order corresponding to the player ID obtained at S204 in the switching order table (FIG. 17) is updated to the value of the variable i, and the remaining restriction period counter corresponding to the player ID obtained S204 is updated to zero (S209). On the other hand, in the case where the player object 56 is located within the goal front area 59 of the operation target team, whether or not a "player object 56 of the opponent team, of which position kind is a forward" is located within the dead angle area 64 of the player object 56 is determined (S207). This process is carried out similar to the process at S107.

In the case where it is determined that no "player object 56 of the opponent team, for which position kind is a forward" is located within the dead angle area 64 of the player object 56, the switching order corresponding to the player ID obtained at S204 in the switching order table (FIG. 17) is updated to the value of the variable i, and the remaining restriction period counter corresponding to the player ID obtained at S204 is updated to zero (S209). On the other hand, in the case where any "player object 56 of the opponent team, for which position kind is a forward" is located within the dead angle area 64 of the player object 56, the switching order of the player ID obtained at S204 in the switching order table (FIG. 17) is updated to the value of the variable i and the remaining restriction period counter corresponding to the player ID obtained at S204 is updated to 90 (S208).

After the process at S208 or S209, whether or not the value of the variable i is 11 is determined (S210). In the case where it is determined that the value of the variable i is not 11, the value of the variable i is incremented (S211) before the processes from S204 to S210 are carried out again. On the other hand, in the case where the value of the variable i is 11, it means that the switching orders and remaining restriction period counters of the respective player objects 56 of the operation target team have been determined, and therefore, the switching order table initializing process is terminated.

With the switching order table initializing process terminated, the value of the variable j is initialized to one (S212). Then, whether or not the remaining restriction period counter of the player object 56 with the switching order $j^{th}$ (FIG. 17) is equal to or smaller than zero is determined (S213).

In the case where it is determined that the remaining restriction period counter of the player object 56 with the switching order $j^{th}$ is equal to or smaller than zero, the player object 56 (the player object 56 with the switching order $j^{th}$) is determined as an operation target, and the player ID thereof is registered as an operation target player ID (FIG. 12) (S217). On the other hand, in the case where the remaining restriction period counter of the player object 56 with the switching order $j^{th}$ is not equal to or smaller than zero, the player object 56 is not selected as an operation target, and the value of the variable j is incremented (S214). In the above, in the case of the value of the variable j larger than 11, the value is updated to one (S215 and S216). The process at S213 is carried out again.

In the case where it is determined at S202 that a switching order update time has yet to arrive (S202: N), the remaining restriction period counters of the respective player objects 56 of the operation target team (FIG. 17) are decremented (S219). Note that the remaining restriction period counter of a player object 56 with the remaining restriction period counter already set as zero is restricted from being decremented.

Thereafter, whether or not the operation target switching operation has been carried out is determined (S220). This process is carried out similar to the process at S113. In the case where it is determined that an operation target switching operation has been carried out, the switching order n of the user's current operation target player object 56 is obtained (S221). The switching order n is obtained, based on the operation target specifying data (FIG. 12) and switching order table (FIG. 17). Then, the variable j is updated to n+1 (S222), and the processes from S213 to S218 are carried out.

After the process at S217 or determination at S220 that the operation target switching operation is not carried out (S220: N), a game screen image is produced (S218). This process is carried out similar to that at S112.

According to the process shown in FIGS. 15 and 16, the player object 56 with the remaining restriction period counter (FIG. 17) not equal to or smaller than zero is restricted from being selected as an operation target (see S213). Further, the remaining restriction period counter of a player object 56 satisfying the above described conditions 1 to 3 among the player objects 56 of the operation target team is set with the initial value 90 (see S205 to S208). As the remaining restriction period counter is decremented every $1/60^{th}$ of a second (see S219), the player object 56 satisfying the above described conditions 1 to 3 among the player objects 56 of the operation target team is restricted from being selected as an operation target during a period after arrival of a switching order update time (after the switching order table is initialized) before elapse therefrom of a predetermined restriction period of time (1.5 seconds (=90/60 seconds) in this embodiment).

According to the above described game device 10, a picture in which a defender player object 56 loses sight of a forward player object 56 of the opponent team having moved so as to disappear from the view of the defender player object 56, and thus delays in responding to (defending against) the forward player object 56 is preferably produced. For example, assume a case where the player object 56b-1 in the state shown in FIG. 8(a), for example, passes the ball object 58 to the player object 56b-2 (see FIG. 8(b)). In this case, the player object 56a-2, when satisfying the above described conditions 1 to 3, is restricted from being selected in the switching as an operation target. In this case, the user is restricted from operating the player object 56a-2 to respond (defense) to the player object 56b-2.

Here, it should be noted that the present invention is not limited to the above-described embodiment.

For example, the switching orders of the respective player objects 56 may be determined such that the switching order of a player object 56 satisfying the above described conditions 1 to 3 among the player objects 56 of the operation target team is delayed to be later than the original switching order thereof. For example, assume a case in which the respective distances L3, L4, L5, L6 between the ball object 58 and the player objects 56 with the player ID's "A03", "A04", "A05", "A06", respectively, hold a relationship L3<L4<L5<L6, and the player object 56 with the player ID "A03" satisfies the above described conditions 1 to 3. In this case, the switching order of the player object 56 with the player ID "A03" may be delayed by a predetermined step (e.g., two steps). Specifically, where the original switching orders of the players ID "A03", "A04", "A05", "A06" are 1, 2, 3, 4, respectively, the switching orders thereof may be determined as 3, 1, 2, 4, respectively. With the switching orders determined as described above, the operation target may be switched according to the determined switching order in response to an operation target switching operation. In this case, the user, who wishes to operate the player object 56 with the player ID "A03", is required to carry out more operation target switching operations than are normally required. Therefore, in the above case also, a picture in which a defender player object 56 of the operation target team loses sight of a forward player object 56 of the opponent team having moved so as to disappear from the view of the defender player object 56, and thus delays in responding to (defending) the forward player object 56 can be preferably produced.

Also, for example, operation target switching restriction relative to the player object 56 satisfying the above described conditions 1 to 3 among the player objects 56 of the operation target team may be effected only when the ball object 58 is passed to "a forward player object 56 of the opponent team" located within the dead angle area 64 of the player object 56 (which satisfies the above described conditions 1 to 3).

In other words, in the case where there exists a player object 56, among the player objects 56 of the operation target team, which satisfies the conditions 1, 2, and 3a described below at a time when any forward player object 56 of the opponent team shifts from a state of not holding the ball object 58 to a state of holding the ball object 58 (e.g., a time when any forward player object 56 of the opponent team receives the ball object 58 from another player object 56), restriction on the player object 56 in being selected as the operation target is effected.

[Condition 1] The position kind is a defender.
[Condition 2] The position is within the goal front area 59 of the operation target team.
[Condition 3a] A forward player object 56 of the opponent team is located within the dead angle area 64 and holds the ball object 58.

Note that the determination as to whether or not any of the forward player objects 56 of the opponent team shifts from a state of not holding the ball object 58 to a state of holding the ball object 58 is made based on a determination (monitoring), e.g., as to whether or not the forward player object 56 shifts from a state in which the distance between the player object 56 and the ball object 58 is larger than a ball holding determination reference distance to a state in which the distance is equal to or smaller than the ball holding determination reference distance. In other words, the determination is made based on a determination (monitoring) as to whether or not the ball object 58 has moved into any ball holding determination reference area of the forward player object 56 of the opponent team. Note that the ball holding determination reference area is an area with the distance from the position of the player object 56 equal to or shorter than the ball holding determination reference distance.

As described above, switching to the player object 56a-2 as an operation target may not be restricted in the state shown in, e.g., FIG. 8(a), and may be effected when the state shown in FIG. 8(b) is established.

Further, for example, a parameter indicating how well a player object 56 disappears from the view of another player (hereinafter referred to as a first ability parameter) and a parameter indicating the height of the ability to sense such an action of another player (hereinafter referred to as a second ability parameter) may be set with respect to the respective player objects 56.

In this case, a condition 4 stating "the second ability parameter value is smaller than the first ability parameter value of a forward player object 56 of the opponent team located within the dead angle area 64" may be included in addition to the above described conditions 1 to 3.

Further, the size of the dead angle area 64 of a player object 56 may be changed, based on at least one of the second ability parameter of the player object 56 and the first ability parameter of a forward player object 56 of the opponent team. For example, the reference angle (θ) and/or reference distance (R) may be changed, based on the second ability parameter value of the player object 56. More specifically, as the second ability parameter of a player object 56 becomes larger, the reference angle (θ) and/or reference distance (R) may become smaller. Further, for example, the reference angle (θ) and/or reference distance (R) may be changed, based on the difference between the second ability parameter of the player object 56 and the first ability parameter value of the forward player object 56 of the opponent team. More specifically, as a value obtained by subtracting the first ability parameter value of the forward player object 56 of the opponent team from the second ability parameter of the player object 56 becomes larger, the value of the reference angle (θ) and/or reference distance (R) becomes smaller.

Likewise, the initial value (90 in this embodiment) of the remaining restriction period counter (FIG. 17) of a player object 56 may be changed, based on at least one of the second ability parameter of the player object 56 and the first ability parameter of the forward player object 56 of the opponent team.

Also, the value of the second ability parameter of a player object 56 may be corrected, based on whether or not a teammate player object 56 is located within a range within a predetermined distance from the position of the player object 56. In this case, determination as to whether or not the above described condition 4 is satisfied, determination about the size of the dead angle area 64, and determination about the initial value of the remaining restriction period counter, may be made based on the corrected second ability parameter value.

Further, for example, the above described condition 3 may alternatively be read, as a condition 3b, as a "forward player object 56 of the opponent team is located within the dead angle area 64, and moves at a speed equal to or faster than a predetermined speed". Also, for example, the dead angle area 64 of the player object 56 may be a fan-like area in which the "direction opposite from the direction from the player object 56 to the ball object 58" and a direction extending from the position of the player object 56 form an angle equal to or smaller than a predetermined reference angle (θ), and the distance (a distance on the XZ plane system) from the player object 56 is within a predetermined reference distance (R).

Note that, for example, the opponent team may be operated by another user, and the operation target team and the opponent team may be operated by a plurality of users.

Further, for example, a game carried out in the game device 10 is not limited to a soccer game, and may be, e.g., any sport game (a game, such as basket ball, ice hockey, or the like, carried out using a moving body such as a ball, a puck, or the like) other than a soccer game. Also, a game carried out in the game device 10 may be any game (an action game or the like) other than a sport game. The present invention can be applied to a game device for producing a game which requires preferable production of a picture in which a first game character loses sight of a second game character having moved so as to disappear from the view of the first game character, and thus delays in responding to (defend against or the like) the second game character.

Still further, although it is described in the above that a program is supplied from a DVD-ROM 25, or an information storage medium, to the consumer game device 11, the program may alternatively be distributed via a communication network to a home or the like. FIG. 18 is a diagram showing an overall structure of a program distribution system using a communication network. Referring to FIG. 18, a program distribution method according to the present invention will be described. As shown, the program distribution system 100 comprises a game database 102, a server 104, a communication network 106, a personal computer 108, a consumer game device 110, and a PDA (personal digital assistant) 112. The game database 102 and the server 104 together constitute a program distribution device 114. The communication network 106 is constituted by the Internet, a cable television network, or the like, for example. In this system, a program having the content identical to that stored in the DVD-ROM 25 is stored in the game database (an information storage medium) 102. A person wishing to obtain a game sends a game distribution request via the personal computer 108, the consumer game device 110, the PDA 112, or the like, which is then transmitted via the communication network 106 to the server 104. Then, the server 104, in response to the game distribution request, reads the program from the game database 102, and sends the read program to the entity having requested the game distribution, such as the personal computer 108, the consumer game device 110, the PDA 112, or the like. It should be noted that although it is arranged here that a game is distributed in response to a game distribution request, the server 104 may unidirectionally sends a game. Further, simultaneous distribution of all program components necessary to realize a game (collective distribution) is unnecessary, and distribution of only a component necessary in each aspect of the game (divided distribution) is applicable instead. The above described game distribution via the communication network 106 makes it possible for a person wishing to obtain the program to readily obtain the desired program.

The invention claimed is:

1. A game device for displaying a game screen image showing a picture of a game space where a plurality of first game characters and a second game character are placed, the game device comprising:
 a processor and a memory, the processor configured to operate as:
 an operation target selection unit that selects an operation target character from among the plurality of first game characters; and
 an operation target control unit that changes a state of the operation target character, in the game space, based on a signal input from an operation unit,
 wherein
 the operation target selection unit includes:
  a determination unit that determines whether or not a position of the second game character is included in a determination target area in the game space, the determination target area being a dead angle area to the rear of the first game character, the dead angle area determined based on a position and orientation of the first game character, and
  a selection restriction unit that prevents, in the case where it is determined that the position of the second game character is included in the dead angle area of the first game character, selection of the first game character as the operation target character by the operation target selection unit.

2. The game device according to claim 1, wherein the selection restriction unit prevents, in the case where it is determined that the position of the second game character is included in the dead angle area of the first game character, selection of the first game character as the operation target character for a predetermined restriction period of time.

3. The game device according to claim 2, further comprising:
 a distinctive display unit that distinctively displays, in the case where it is determined that the position of the second game character is included in the dead angle area of the first game character, the first game character on a game screen.

4. The game device according to claim 1, wherein the operation target selection unit selects, in the case where it is determined that the position of the second game character is included in the dead angle area of the first game character, another first game character from among the plurality of first game characters as the operation target character.

5. The game device according to claim 4, further comprising
 distinctive display unit that distinctively displays, in the case where it is determined that the position of the second game character is included in the dead angle area of the first game character, the first game character on a game screen.

6. The game device according to claim 1, further comprising
 a distinctive display unit that distinctively displays, in the case where it is determined that the position of the second game character is included in the dead angle area of the first game character, the first game character on a game screen.

7. The game device according to claim 1, wherein the at least one of the plurality of first game characters has a reference direction to the front of the first game character, and the dead angle area is defined by a distance and an angle along a rear direction opposite to the reference direction.

8. The game device according to claim 7, wherein the reference direction comprises a direction in which the body of the first game character is directed, a direction in which a head of the first game character is directed, or a viewing direction of the first game character.

9. A game device for displaying a game screen image showing a picture of a game space where a plurality of first game characters and a second game character are placed, the game device comprising:

a processor and a memory, the processor configured to operate as:

an operation target selection unit that selects an operation target character from among the plurality of first game characters; and an operation target control unit that changes a state of the operation target character, in the game space, based on a signal input from an operation unit, wherein the operation target selection unit includes:

a determination unit that determines, for at least one of the plurality of first game characters, whether or not a position of the second game character is included in a determination target area in the game space, the determination target area being determined based on a position and orientation of the first game character, and a selection restriction unit that prevents, in the case where it is determined that the position of the second game character is included in the determination target area, selection of the at least one first game character as the operation target character by the operation target selection unit, wherein the operation target selection unit selects the operation target character from among the plurality of first game characters according to a switching priority of the plurality of respective first game characters, and the selection restriction unit changes, in the case where it is determined that the position of the second game character is included in the determination target area, the switching priority of the at least one first game character to a lower priority.

10. The game device according to claim 9, further comprising:

a distinctive display unit that distinctively displays, in the case where it is determined that the position of the second game character is included in the dead angle area of the first game character, the first game character on a game screen.

11. A control method for controlling a game device for displaying a game screen image showing a picture of a game space where a plurality of first game characters and a second game character are placed, the game device including a processor and a memory, the control method comprising:

the processor performing an operation of selecting an operation target character from among the plurality of first game characters; and the processor performing an operation of changing a state of the first game character selected as the operation target character, in the game space, based on a signal, wherein the selecting an operation target character further includes:

the processor performing an operation of determining whether or not a position of the second game character is included in a determination target area in the game space, the determination target area being a dead angle area to the rear of the first game character, the dead angle area determined based on a position and orientation of the first game character, and the processor performing an operation of preventing, in the case where it is determined that the position of the second game character is included in the dead angle area of the first game character, selection of that first game character.

12. The control method according to claim 11, wherein the at least one of the plurality of first game characters has a reference direction to the front of the first game character, and the dead angle area is defined by a distance and an angle along a rear direction opposite to the reference direction.

13. The control method according to claim 12, wherein the reference direction comprises a direction in which the body of the first game character is directed, a direction in which a head of the first game character is directed, or a viewing direction of the first game character.

14. A non-transitory computer readable information storage medium storing a program for causing a computer to function as a game device for displaying a game screen image showing a picture of a game space where a plurality of first game characters and a second game character are placed, the program for causing the computer to function as:

an operation target selection unit that selects an operation target character from among the plurality of first game characters; and an operation target control unit that changes a state of the operation target character, in the game space, based on a signal input from an operation unit, wherein the operation target selection unit further includes:

a determination unit that determines whether or not a position of the second game character is included in a determination target area in the game space, the determination target area being a dead angle area to the rear of the first game character, the dead angle area determined based on a position and orientation of the first game character, and a selection restriction unit that prevents, in the case where it is determined that the position of the second game character is included in the dead angle area of the first game character, selection of the first game character as the operation target character by the operation target selection unit.

15. The computer readable information storage medium according to claim 14, wherein the at least one of the plurality of first game characters has a reference direction to the front of the first game character, and the dead angle area is defined by a distance and an angle along a rear direction opposite to the reference direction.

16. The computer readable information storage medium according to claim 15, wherein the reference direction comprises a direction in which the body of the first game character is directed, a direction in which a head of the first game character is directed, or a viewing direction of the first game character.

17. A control method for controlling a game device for displaying a game screen image showing a picture of a game space where a plurality of first game characters and a second game character are placed, the game device including a processor and a memory, the control method comprising:

the processor performing an operation of selecting an operation target character from among the plurality of first game characters; and the processor performing an operation of changing a state of the operation target character, in the game space, based on a signal input from an operation unit, wherein the selecting the operation target character includes:

the processor performing an operation of determining, for at least one of the plurality of first game characters, whether or not a position of the second game character is included in a determination target area in the game space, the determination target area being determined based on a position and orientation of the first game character, and the processor performing an operation of preventing, in the case where it is determined that the position of the second game character is included in the determination target area, selection of the at least one first game character as the operation target character by the operation target selection unit, wherein the operation target character is selected from among the plurality of first game characters according to a switching priority of the plurality of respective first game characters, and in the case where it is determined that the position of the second game character is included in the determination target area, the switching priority of the at least one first game character is changed to a lower priority.

18. A non-transitory computer readable information storage medium storing a program for causing a computer to function as a game device for displaying a game screen image showing a picture of a game space where a plurality of first game characters and a second game character are placed, the program for causing the computer to function as:

an operation target selection unit that selects an operation target character from among the plurality of first game characters; and an operation target control unit that changes a state of the operation target character, in the game space, based on a signal input from an operation unit, wherein the operation target selection unit includes:

a determination unit that determines, for at least one of the plurality of first game characters, whether or not a position of the second game character is included in a determination target area in the game space, the determination target area being determined based on a position and orientation of the first game character, and a selection restriction unit that prevents, in the case where it is determined that the position of the second game character is included in the determination target area, selection of the at least one first game character as the operation target character by the operation target selection unit, wherein the operation target selection unit selects the operation target character from among the plurality of first game characters according to a switching priority of the plurality of respective first game characters, and the selection restriction unit changes, in the case where it is determined that the position of the second game character is included in the determination target area, the switching priority of the at least one first game character to a lower priority.

19. A game device for displaying a game screen image showing a picture of a game space where a first team including a plurality of first game characters and a second game character belonging to a second team are placed, the game device comprising:

a processor and a memory, the processor configured to operate as:

an operation target selection unit that selects an operation target character from among the first team; and an operation target control unit that changes a state of the operation target character, in the game space, based on a signal input from an operation unit, wherein the operation target selection unit includes:

a determination unit that determines, for at least one of the first game characters of the first team, whether or not a position of the second game character of the second team is included in a determination target area in the game space, the determination target area being a dead angle area to the rear of the first game character, the dead angle area determined based on a position and orientation of the first game character, and a selection restriction unit that prevents, in the case where it is determined that the position of the second game character is included in the determination target area, selection of the at least one first game character as the operation target character by the operation target selection unit.

20. A control method for controlling a game device for displaying a game screen image showing a picture of a game space where a first team including a plurality of first game characters and a second game character belonging to a second team are placed, the game device including a processor and a memory, the control method comprising:

the processor performing an operation of selecting an operation target character from among the first team; and the processor performing an operation of changing a state of the operation target character, in the game space, based on a signal input from an operation unit, wherein the selecting the operation target character includes:

the processor performing an operation of determining, for at least one of the plurality of first game characters, whether or not a position of the second game character of the second team is included in a determination target area in the game space, the determination target area being a dead angle area to the rear of the first game character, the dead angle area determined based on a position and orientation of the first game character, and the processor performing an operation of preventing, in the case where it is determined that the position of the second game character is included in the determination target area, selection of the at least one first game character as the operation target character by the operation target selection unit.

21. A non-transitory computer readable information storage medium storing a program for causing a computer to function as a game device for displaying a game screen image showing a picture of a game space where a first team including a plurality of first game characters and a second game character belonging to a second team are placed, the program for causing the computer to function as:

an operation target selection unit that selects an operation target character from among the first team; and an operation target control unit that changes a state of the operation target character, in the game space, based on a signal input from an operation unit, wherein the operation target selection unit includes:

a determination unit that determines, for at least one of the first game characters of the first team, whether or not a position of the second game character of the second team is included in a determination target area in the game space, the determination target area being a dead angle area to the rear of the first game character, the dead angle area determined based on a position and orientation of the first game character, and a selection restriction unit that prevents, in the case where it is determined that the position of the second game character is included in the determination target area, selection of the at least one first game character as the operation target character by the operation target selection unit.

* * * * *